(12) United States Patent
Li et al.

(10) Patent No.: US 11,707,411 B2
(45) Date of Patent: Jul. 25, 2023

(54) PHARMACEUTICAL PACKAGES WITH COATINGS COMPRISING POLYCYANURATES

(71) Applicant: CORNING INCORPORATED, Corning, NY (US)

(72) Inventors: Lingke Li, Shanghai (CN); Yang Li, Shanghai (CN); Arlin Lee Weikel, Mansfield, PA (US)

(73) Assignee: CORNING INCORPORATED, Corning, NY (US)

( * ) Notice: Subject to any disclaimer, the term of this patent is extended or adjusted under 35 U.S.C. 154(b) by 0 days.

(21) Appl. No.: 16/939,478

(22) Filed: Jul. 27, 2020

(65) Prior Publication Data

US 2021/0038474 A1 Feb. 11, 2021

Related U.S. Application Data

(60) Provisional application No. 62/884,731, filed on Aug. 9, 2019.

(51) Int. Cl.
*A61J 1/14* (2023.01)
*B65D 1/40* (2006.01)
(Continued)

(52) U.S. Cl.
CPC .............. *A61J 1/1468* (2015.05); *B65D 1/40* (2013.01); *B65D 65/42* (2013.01); *B65D 85/70* (2013.01);
(Continued)

(58) Field of Classification Search
CPC ........ B65D 23/08–0821; C03C 17/005; C03C 2218/111; C03C 2218/32; C03C 2217/78;
(Continued)

(56) References Cited

U.S. PATENT DOCUMENTS 3,976,819 A   8/1976 Mori et al.
4,030,904 A * 6/1977 Battye ..................... C03C 17/42
                                                        65/60.2

(Continued)

FOREIGN PATENT DOCUMENTS

AU       2003208142 A1   7/2004
DE          2508109 A1   8/1975
(Continued)

OTHER PUBLICATIONS

Polymer Properties Database, Polycyanurates (Cyanate orTriazine Polymers), 2015, Crow, https://polymerdatabase.com/polymer%20classes/Polycyanurate%20type.html (Year: 2015).*
(Continued)

*Primary Examiner* — Michael C Romanowski
(74) *Attorney, Agent, or Firm* — F. Brock Riggs

(57) ABSTRACT

The present disclosure is directed to pharmaceutical packages which include a coating that comprises polycyanurate, and methods for the production of such. In one or more embodiments of the present disclosure, a pharmaceutical package may comprise a glass container comprising a first surface and a second surface opposite the first surface. The first surface may be an outer surface of the glass container. The pharmaceutical package may further comprise a coating positioned over at least a portion of the first surface of the glass container. The coating may comprise polycyanurate.

11 Claims, 3 Drawing Sheets

(51) Int. Cl.
| | |
|---|---|
| B65D 65/42 | (2006.01) |
| B65D 85/00 | (2006.01) |
| C03C 17/00 | (2006.01) |
| C03C 17/32 | (2006.01) |
| C09D 179/04 | (2006.01) |

(52) U.S. Cl.
CPC .......... C03C 17/005 (2013.01); C03C 17/322 (2013.01); C09D 179/04 (2013.01); *C03C 2217/78* (2013.01); *C03C 2218/111* (2013.01); *C03C 2218/32* (2013.01)

(58) Field of Classification Search
CPC . C03C 17/003; C03C 17/28; C03C 17/32–38; C09D 179/04; B32B 17/10
USPC .............................................. 428/34.1–36.92
See application file for complete search history.

(56) References Cited

U.S. PATENT DOCUMENTS

| | | | | |
|---|---|---|---|---|
| 4,110,364 | A | * | 8/1978 | Gaku ................... C08G 73/121 430/283.1 |
| 4,115,599 | A | * | 9/1978 | Taylor ................... C03C 17/326 427/515 |
| 4,315,573 | A | * | 2/1982 | Bradley ................... B32B 17/10 427/386 |
| 4,683,168 | A | * | 7/1987 | Hares ....................... C03C 17/32 428/335 |
| 5,015,719 | A | | 5/1991 | Papathomas et al. |
| 7,201,965 | B2 | | 4/2007 | Gulati et al. |
| 8,551,898 | B2 | | 10/2013 | Danielson et al. |
| 9,763,852 | B2 | | 9/2017 | Fadeev et al. |
| 10,023,495 | B2 | | 7/2018 | Chang et al. |
| 2011/0045219 | A1 | | 2/2011 | Stewart et al. |
| 2011/0226786 | A1 | * | 9/2011 | Remington, Jr. ..... C03C 17/007 427/508 |
| 2011/0247756 | A1 | * | 10/2011 | Wilson .................... C08L 63/00 156/307.7 |
| 2014/0001143 | A1 | * | 1/2014 | Fadeev ................... C03C 17/42 215/12.2 |
| 2014/0034544 | A1 | * | 2/2014 | Chang ..................... A61J 1/065 206/524.3 |
| 2014/0288245 | A1 | * | 9/2014 | Swier ....................... C08L 79/04 525/474 |
| 2016/0075902 | A1 | * | 3/2016 | Konarski ............. C09D 109/06 428/327 |

FOREIGN PATENT DOCUMENTS

| | | |
|---|---|---|
| GB | 1305762 A | 2/1973 |
| GB | 2398790 A | 9/2004 |
| JP | 56-159229 A | 12/1981 |

OTHER PUBLICATIONS

Ramirez et al., "Thermal decomposition of cyanate ester resins", Polymer Degradation and Stability, vol. 78, pp. 73-82, 2002 (Year: 2002).*

Andreas Kandelbauer, "Cyanate Esters", The Handbook of Thermoset Plastics, pp. 425-457, 2014, DOI: http://dx.doi.org/10.1016/B978-1-4557-3107-7.00011-7 (Year: 2014).*

Dreyer, C., Söthje, D. and Bauer, M. (2014) Progress in Recycling of Composites with Polycyanurate Matrix. Advances in Chemical Engineering and Science, 4, 167-183. http://dx.doi.org/10.4236/aces.2014.42020 (Year: 2014).*

Abed et al., "Synthesis ad Charaterization of New Phosphorus and Other Heteroatom Containing Aryl Cyanate Ester Monomers and Netwroks", J Polym Sci Polym Chem 1997, 35 (6), pp. 977-987.

Bauer M, B. J., Ruhman R, Kuhn G, Acta Polym 1989, 40, 397.

Brostow et al., "Handbook of Thermoset Plastics 8-Epoxies", pp. 191-252.

De Rosa et al., "Scratch Resistant Polyimide Coatings for Aluminosilicate Glass Surfaces", The Journal of Adhesion, vol. 78, 2002, pp. 113-127.

Gursen et al, "Preparation, Characterization and Dielectric Properties of Polycyanuarte Films Cyclotrimerized in the Presence of Different Catalysts", Polymer Engineering and Science 2013,53, pp. 662-670.

J. Bauer & M. Bauer (1990) Kinetic Structural Model for the Network Build-Up During the Reaction of Cyanic Acid Esters with Glycidyl Ethers, Journal of Macromolecular Science: Part A—Chemistry, 27:1, 97-116.

Kandelbauer, Andreas, "Handbook of Thermoset Plastics—Cyanate Esters", School of Applied Chemistry, 2014, pp. 425-457.

Kern et al, "Polymers with Pendant Cyanate Ester Groups: Synthesis, Thermal Curing and Photocrosslinking", Eur. Polym. J. vol. 34, No. 7, 1998, pp. 987-995.

Mathew et al., "Effect of Polymeric Additives on Properties of Glass-Bisphenol A dicyanate Laminate Composites", Journal of Applied Polymer Science, 2000, vol. 77, pp. 75-88.

Michael L. Ramirez, r. W., thermal decomposition of cyanate ester resins. Polymer degradation and stability 2002, 78, 73-82.

Nair et al., "Cyanate Ester Resins, Recent Developments", Advances in Polymer Science, vol. 155, pp. 1-219.

Nair et al., "Cyanate Esters Based on Cardanol Modified-Phenol-Formaldehyde Resins: Syntheses and Thermal Characteristics", Polym Sci Polym Chem 1995, vol. 33, pp. 621-627.

Quinn, George D., "NIST Recommended Practice Guide: Fractography of Ceramics and Glasses", NIST special publication, 960-16, 2007, 557 pages.

Sheng-Hua Lu, Z.-W. Z., preparation and properties of cyanate ester modified by epoxy resin and phenolic resin. applied polymer science 2007, 103, 3150-3156.

T.Reams, J., Effect of chemical structure and network formation on physical properties of Di(Cyanate ester) thermosets, appl. mater, interfaces 2012, 4, 527-535.

Wenfeng et al., "Cyanate Ester/Bismaleimide Co-cured Resins". Materials Review 2008, vol. 22, Issue No. 7, pp. 39-43.

Zhao et al., "Deposition and Characterization of a Low-er Thin Film Based on Plasma-Polymerized 4-Cumylphenol Cyanate Ester", Plasma Processes and Polymers, 2013,10, pp. 41-50.

International Search Report and Written Opinion of the International Searching Authority; PCT/US2020/044690, dated Nov. 18, 2020, 10 pages; European Patent Office.

* cited by examiner

PHARMACEUTICAL PACKAGES WITH COATINGS COMPRISING POLYCYANURATES

CROSS REFERENCE TO RELATED APPLICATIONS

This application claims the benefit of priority under 35 U.S.C. § 120 of U.S. Provisional Application Ser. No. 62/884,731 filed on Aug. 9, 2019, the content of which is relied upon and incorporated herein by reference in its entirety

BACKGROUND

Field

The present specification generally relates to glass articles and, more specifically, to coatings on glass articles such as pharmaceutical packages.

Technical Background

Historically, glass has been used as the preferred material for packaging pharmaceuticals because of its hermeticity, optical clarity, and excellent chemical durability relative to other materials. Specifically, the glass used in pharmaceutical packaging should have adequate chemical durability so as not to affect the stability of the pharmaceutical compositions contained therein. Glasses having suitable chemical durability for many pharmaceutical applications include those glass compositions within the ASTM standard 'Type 1B' which have a proven history of chemical durability.

However, use of glass for such applications is limited by the mechanical performance of the glass. In the pharmaceutical industry, glass breakage is a safety concern for the end user, as the broken package and/or the contents of the package may injure the end user. Glass breakages on the filling line also cause costly loss of drug or even potential recalls due to faulty packaging or broken glass being contained in neighboring sealed packages from the filling line. Further, non-catastrophic breakage (i.e., when the glass cracks but does not break) may cause the contents to lose their sterility which, in turn, may result in costly product recalls.

Specifically, the high processing speeds utilized in the manufacture and filling of glass pharmaceutical packages may result in mechanical damage on the surface of the package, such as abrasions, as the packages come into contact with processing equipment, handling equipment, and/or other packages. This mechanical damage significantly decreases the strength of the glass pharmaceutical package resulting in an increased likelihood that cracks will develop in the glass, potentially compromising the sterility of the pharmaceutical contained in the package or causing the complete failure of the package.

One approach to improving the mechanical durability of the glass package is to thermally and/or chemically temper the glass package. Thermal tempering strengthens glass by inducing a surface compressive stress during rapid cooling after forming. This technique works well for glass articles with flat geometries (such as windows), glass articles with thicknesses greater than about 2 mm, and glass compositions with high thermal expansion. However, pharmaceutical glass packages typically have complex geometries (vial, tubular, ampoule, etc.), thin walls (sometimes between about 1-1.5 mm), and are produced from low expansion glasses, making glass pharmaceutical packages unsuitable for strengthening by conventional thermal tempering. Chemical tempering also strengthens glass by the introduction of surface compressive stress. The stress is introduced by submerging the article in a molten salt bath. As ions from the glass are replaced by larger ions from the molten salt, a compressive stress is induced in the surface of the glass. The advantage of chemical tempering is that it can be used on complex geometries, thin samples, and is relatively insensitive to the thermal expansion characteristics of the glass substrate.

However, while the aforementioned tempering techniques improve the ability of the strengthened glass to withstand blunt impacts, these techniques are less effective in improving the resistance of the glass to abrasions, such as scratches, which may occur during manufacturing, shipping and handling. Such defects may make the glass more susceptible to breakage.

Accordingly, a need exists for alternative glass articles which have improved resistance to mechanical damage.

SUMMARY

In one or more embodiments of the present disclosure, a pharmaceutical package may comprise a glass container comprising a first surface and a second surface opposite the first surface. The first surface may be an outer surface of the glass container. The pharmaceutical package may further comprise a coating positioned over at least a portion of the first surface of the glass container. The coating may comprise polycyanurate.

In one or more additional embodiments of the present disclosure, a pharmaceutical package may comprise a glass container comprising a first surface and a second surface opposite the first surface. The first surface may be an outer surface of the glass container. The pharmaceutical package may further comprise a coating positioned over at least a portion of the first surface of the glass container. The coating may comprise a polymer formed from at least one or more cyanate esters monomers.

In yet one or more additional embodiments of the present disclosure, a coated pharmaceutical package may be produced by a method which may comprise depositing a coating precursor mixture onto a first surface of an outer surface of a glass container, and heating the coating precursor mixture to form a coating on the outer surface of the glass container. The coating precursor mixture may comprise one or more cyanate esters, and the coating may comprise polycyanurate.

Additional features and advantages of the coatings that may be used for coating glass article, coated glass articles, and methods and processes for manufacturing the same will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together

DETAILED DESCRIPTION

Figure 1:
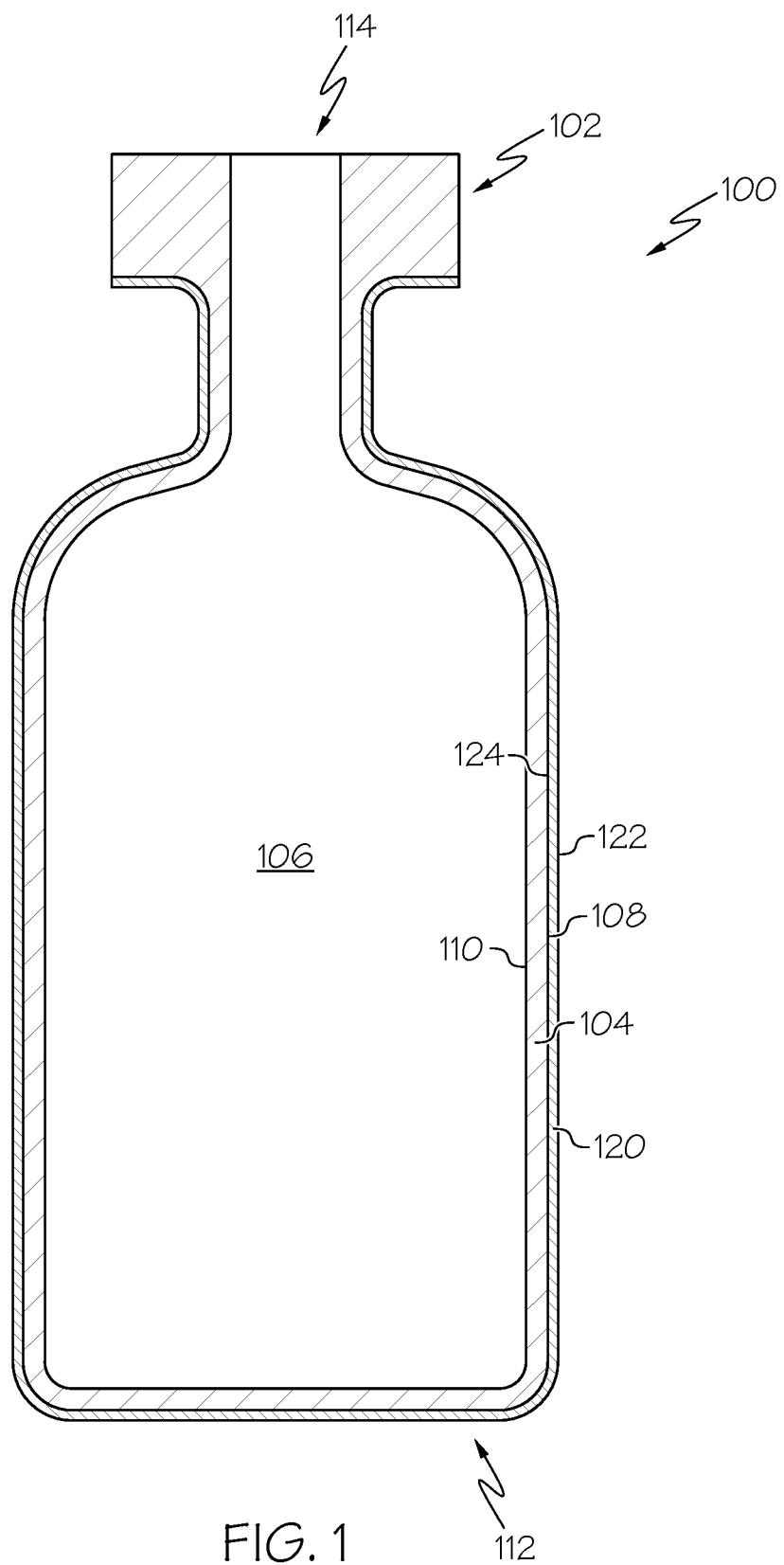
FIG. 1 schematically depicts a cross sectional view of a glass container with a low-friction coating, according to one or more embodiments shown and described herein.

Reference will now be made in detail to various embodiments of coatings, glass articles with coatings, and methods for producing the same, examples of which are schematically depicted in the figures. Such coated glass articles may be glass containers suitable for use in various packaging applications including, without limitation, as pharmaceutical packages. It should be understood that coated glass articles may refer to coated pharmaceutical packages as described in this disclosure. In one or more embodiments, the coatings and/or the coated pharmaceutical packages are thermally stable when, after initial coating application and curing, they are exposed to high temperatures such as those utilized during a depyrogenation process. For example, the coated glass articles described herein may sufficiently retain their low coefficient of friction following a thermal treatment and/or may not substantially yellow in color following such a thermal treatment. These pharmaceutical packages may or may not contain a pharmaceutical composition. In one or more embodiments, the coatings may comprise one or more polycyanurates. In some embodiments, the entire coating may be polycyanurate. In one or more embodiments, the coatings may be low-friction coatings, such as those which have a coefficient of friction which is less than that of bare glass, such as less than 0.7. In one or more embodiments presently disclosed, the coatings that include polycyanurate may have desirable functionality and/or properties as compared with other polymer materials that may be available for coatings on pharmaceutical packaging. For example, coatings which comprise or consist of polycyanurate may provide for reduced coefficient of friction, improved adhesion without the use of a silane coupling agent, and/or solubility in non-toxic solvents during application, as compared with coatings made from other classes of polymers.

Various embodiments of the coatings, glass articles with coatings, and methods for forming the same will be described in further detail herein with specific reference to the appended drawings. While embodiments of the coatings described herein are applied to the outer surface of a glass container, it should be understood that the coatings described may be used as a coating on a wide variety of materials, including non-glass materials and on substrates other than containers including, without limitation, glass display panels and the like.

Generally, a coating may be applied to a surface of a glass article, such as a container that may be used as a pharmaceutical package. The coating may provide advantageous properties to the coated glass article such as a reduced coefficient of friction and increased damage resistance. The reduced coefficient of friction may impart improved strength and durability to the glass article by mitigating frictive damage to the glass. Further, the coating may maintain the aforementioned improved strength and durability characteristics following exposure to elevated temperatures and other conditions, such as those experienced during packaging and pre-packaging steps utilized in packaging pharmaceuticals, such as, for example, depyrogenation, lyophilization, autoclaving and the like. Accordingly, the coatings and glass articles with the coating may be thermally stable at conditions such as those utilized in depyrogenation.

FIG. 1 schematically depicts a cross section of a coated glass article, specifically a coated glass container 100. The coated glass container 100 comprises a glass body 102 and a coating 120. The glass body 102 has a glass container wall 104 extending between an exterior surface 108 (i.e., a first surface) and an interior surface 110 (i.e., a second surface). The interior surface 110 of the glass container wall 104 defines an interior volume 106 of the coated glass container 100. A coating 120 is positioned on at least a portion of the exterior surface 108 of the glass body 102. As used herein, a coating may be "positioned on" a substrate while not in direct contact with the substrate, such as if an intermediate layer is present between the substrate and a coating positioned over that substrate. In some embodiments, the coating 120 may be positioned on substantially the entire exterior surface 108 of the glass body 102. In some embodiments, such as depicted in FIG. 1, the coating 120 may be in direct contact with (i.e., bonded to) the glass body 102 at the exterior surface 108. The coating 120 has an outer surface 122 and a glass body contacting surface 124 at the interface of the glass body 102 and the coating 120.

In one or more embodiments, the coated glass container 100 is a pharmaceutical package. For example, the glass body 102 may be in the shape of a vial, ampoule, ampul, bottle, flask, phial, beaker, bucket, carafe, vat, syringe body, or the like. The coated glass container 100 may be used for containing any composition, and in one embodiment, may be used for containing a pharmaceutical composition. A pharmaceutical composition may include any chemical substance intended for use in the medical diagnosis, cure, treatment, or prevention of disease. Examples of pharmaceutical compositions include, but are not limited to, medicines, drugs, medications, medicaments, remedies, and the like. The pharmaceutical composition may be in the form of a liquid, solid, gel, suspension, powder, or the like.

Figure 2:
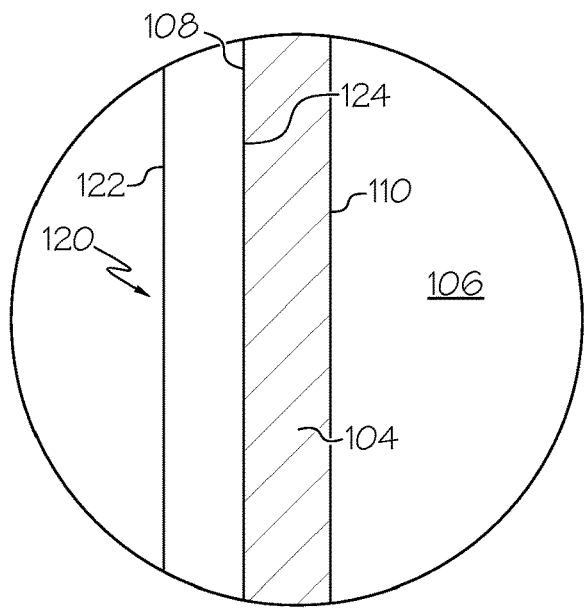
FIG. 2 schematically depicts an enlarged cross sectional view of the glass container of FIG. 1 with a mono-layer low-friction coating, according to one or more embodiments shown and described herein.

Now referring to FIGS. 1 and 2, in one embodiment, the coating 120 comprises a single-layered structure sometimes referred to herein as a "mono-layer" structure. For example, the coating 120 may have a substantially homogenous composition of polycyanurate alone, or polycyanurate mixed with one or more additional components. If two or more components are included in the coating 120, the coating 120 may be mixed but not fully homogenous. For example, in one or more embodiments, one or more chemical constituents of the mixture may congregate at an interface of the coating 120 (e.g., the interface with the glass body 102 or the outer surface 122). In such an embodiment, the local concentration of a chemical constituent may differ over different areas of the coating 120. However, it should be understood that the term "mixed" as used herein refers to layers that have at least some dispersion of at least two chemical components, and includes layers that are not fully homogenous. Generally, a mixed layer is deposited as a mixture of two or more chemical constituents contained in a coating precursor mixture.

As noted herein, the coating 120 includes one or more polycyanurates. In general, polycyanurates are thermally stable polymers that will not degrade significantly or at all when exposed to temperatures suitable for depyrogenation, such as at least about 250° C., at least about 260° C., at least about 280° C., or even at least about 300° C. for about 30 minutes. Polycyanurates, as described herein, include polymers formed from cyanate ester monomers. In additional embodiments, the polycyanurate may be formed from prepolymers which include cyanate ester monomers. Prepolymers refer to partially polymerized substances which are further polymerized to form the polycyanurate in the coating 120. Polycyanurates, as presently described, also include polymers with polycyanurate backbones which are modified by other chemical constituents, or copolymers which include one or more cyanate ester monomeric units along with other, non-cyanate ester monomers. For example, the polycyanurate may be a homopolymer formed from a single cyanate ester species as monomeric units, copolymers (both random or block) which are formed from two or more cyanate ester species, or copolymers which include some polycyanurate backbone structure while additionally including other monomeric species, as is described herein. The polycyanurate may be formed by polymerization means such as curing by heating or other methods, which utilize monomers or prepolymers, or the combination thereof.

The coating 120 may comprise at least 10 wt. %, at least 20 wt. %, at least 30 wt. %, at least 40 wt. %, at least 50 wt. %, at least 60 wt. %, at least 70 wt. %, at least 80 wt. %, at least 90 wt. %, at least 95 wt. %, at least 98 wt. %, at least 99 wt. %, or even at least 99.9 wt. % of polycyanurate. The polycyanurate in the coating 120 may comprise at least 10 wt. %, at least 20 wt. %, at least 30 wt. %, at least 40 wt. %, at least 50 wt. %, at least 60 wt. %, at least 70 wt. %, at least 80 wt. %, at least 90 wt. %, at least 95 wt. %, at least 98 wt. %, at least 99 wt. %, or even at least 99.9 wt. % of components derived from cyanate ester. The portion of the coating derived from any single species of cyanate ester may be at least 10 wt. %, at least 20 wt. %, at least 30 wt. %, at least 40 wt. %, at least 50 wt. %, at least 60 wt. %, at least 70 wt. %, at least 80 wt. %, at least 90 wt. %, at least 95 wt. %, at least 98 wt. %, at least 99 wt. %, or even at least 99.9 wt. % of the total weight of the polycyanurate.

In embodiments of the present disclosure, the polycyanurate may comprise a 3-dimension crosslinked structure, where —OCN functional groups of the cyanate ester monomers form triazine rings. The polycyanurate may comprise monomeric units formed from one or more cyanate esters. A generalized chemical structure of a cyanate ester, which may be used to form the polycyanurate, is depicted in Chemical Structure 1. As is depicted, the cyanate ester comprises —OCN functionalities (such as two —OCN functionalities joined by an R group).

Chemical Structure 1:

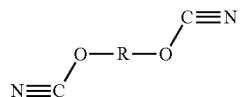

In embodiments of the present disclosure, the R group is not necessarily limited. However, in some embodiments, the utilized cyanate ester may comprise bisphenol functionality, referred to herein as a bisphenol cyanate ester. Generally, bisphenols refer to chemical compounds which include two phenol groups, each of which include an oxygen atom directly attached to phenol group. Such bisphenol functionality may provide for good thermal resistance. Tables 1 and 2 provide examples of contemplated bisphenol cyanate esters which may be included in the polycyanurate. For example, cyanate esters used to form the polycyanurate may be chosen from bisphenol A cyanate ester, bisphenol E cyanate ester, C,C'-((2,2,2-trifluoro-1-(trifluoromethyl)ethylidene)di-4,1-phenylene) ester (sometimes known as hexafluorobisphenol A cyanate ester), tetramethylbisphenol F cyanate ester, bisphenol M cyanate ester, or combinations thereof. However, it should be understood that other cyanate esters may be utilized and that, as such, Tables 1 and 2 are only examples of possible cyanate esters. The cyanate esters may include heteroatoms such as, but not limited to Si, P and/or F. Additionally contemplated for use are aromatic dicyanate esters with phenyl phosphine oxide, sulfone and carbonyl groups, which may have good reactivity and thermal performance. Additionally, cyanate esters such as those which include novolac or polystyrene are contemplated for use in the embodiments herein. It should be understood that prepolymers that may be used to form polycyanurate may include such cyanate esters as monomeric units.

TABLE 1

| Structure | Name | Molecular weight (g/mol) |
|---|---|---|
| ![Bisphenol A Cyanate Ester structure] | Bisphenol A Cyanate Ester | 278.31 |
| ![Bisphenol E Cyanate Ester structure] | Bisphenol E Cyanate Ester | 264.28 |
| ![Hexafluorobisphenol A Cyanate Ester structure] | Hexafluorobisphenol A Cyanate Ester | 386.25 |

TABLE 1-continued

| Structure | Name | Molecular weight (g/mol) |
|---|---|---|
| | Tetramethylbisphenol F Cyanate Ester | 306.36 |
| | Bisphenol M Cyanate Ester | 396.49 |

TABLE 2

| Structure | Name | Short Name |
|---|---|---|
| | Bisphenol A Cyanate Ester | DCBA |
| | C,C'-[(dimethylsilylene)di-4,1-phenylene]ester | Si-DCBA |
| | C,C'-((2,2,2-trifluoro-1-(trifluoromethyl)ethylidene)di-4,1-phenylene)ester | F-DCBA |

According to additional embodiments, the polycyanurate 40 may be formed from one or more of the cyanate esters disclosed herein in Chemical Structures 2-56. The cyanate esters disclosed in Chemical Structures 2-56 may include, but are not limited to, tris(cyanato phenoxy)phosphazene, poly(phenyl)phenylene-dicyanate, polyarylene ether ketone (PEK)-dicyanate, poly ether sulfone (PES)-dicyanate, poly(cyanato phenyl maleimide), poly(4-cyanatophenyl styrene), poly(4-cyanatophenyl styrene)-co-MMA, poly(4-cyanatophenyl styrene)-co-BD, bis(3-allyl-4-cyanatophenyl)propane, bis(3-propenyl-4-cyanatophenyl)propane, 4-cyanatophenyl, 4-cyanato benzoate, and 4,4'-dicyanato biphenyl. It should be understood that the polycyanurate may be formed from a single cyanate ester composition or from multiple cyanate ester compositions, such as those of Chemical Structures 2-56.

Chemical Structure 2:

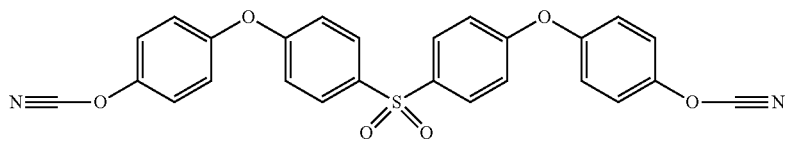 [SMILES: N#COc1ccc(Oc2ccc(S(=O)(=O)c3ccc(Oc4ccc(OC#N)cc4)cc3)cc2)cc1]

Chemical Structure 3:
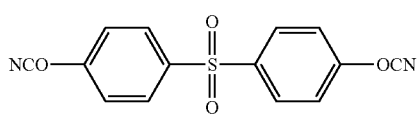
Chemical Structure 4:
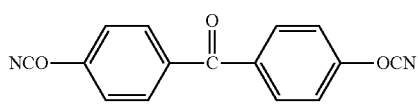
Chemical Structure 5:
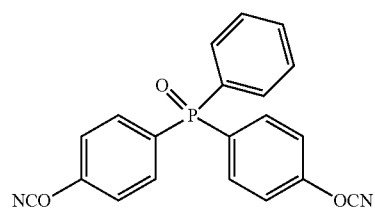
Chemical Structure 6:
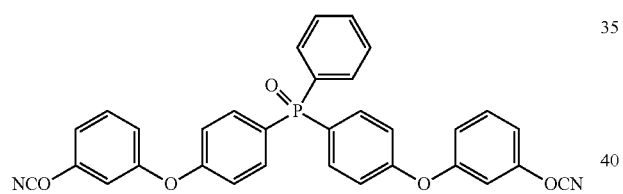
Chemical Structure 7:
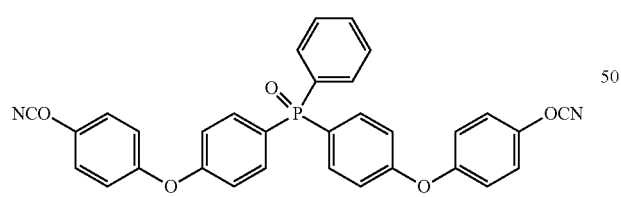
Chemical Structure 8:
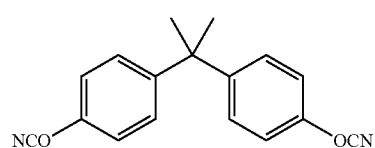
Chemical Structure 9:
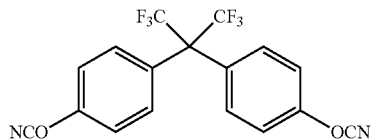
Chemical Structure 10:
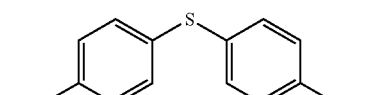
Chemical Structure 11:
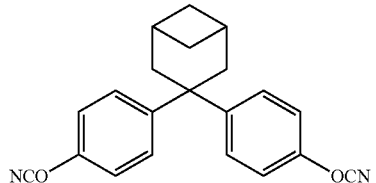
Chemical Structure 12:
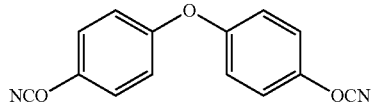
Chemical Structure 13:
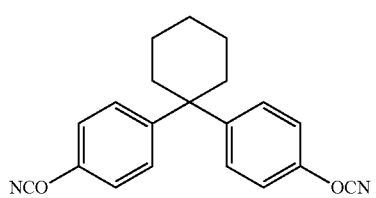
Chemical Structure 14:
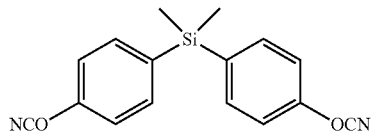
Chemical Structure 15:
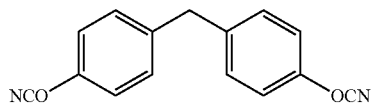

Chemical Structure 16:
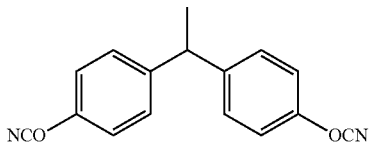
Chemical Structure 17:
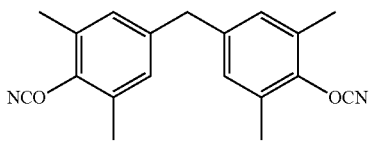
Chemical Structure 18:
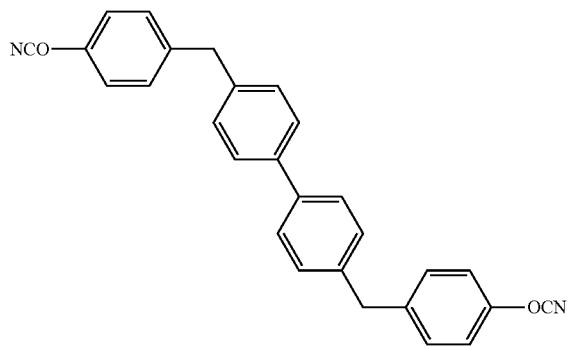
Chemical Structure 19:
Chemical Structure 20:
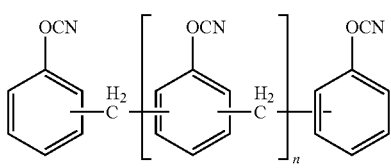
Chemical Structure 21:
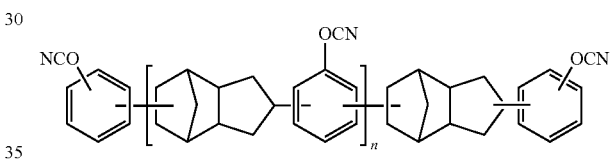
Chemical Structure 22:
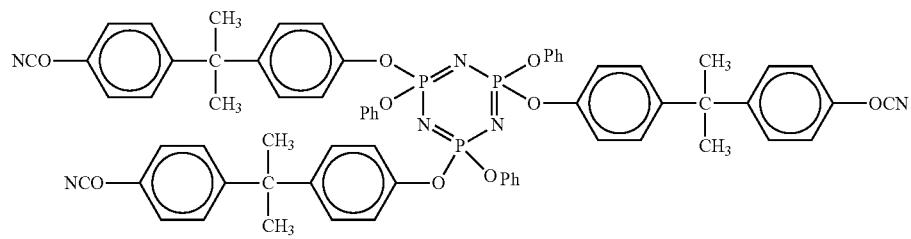
Chemical Structure 23:
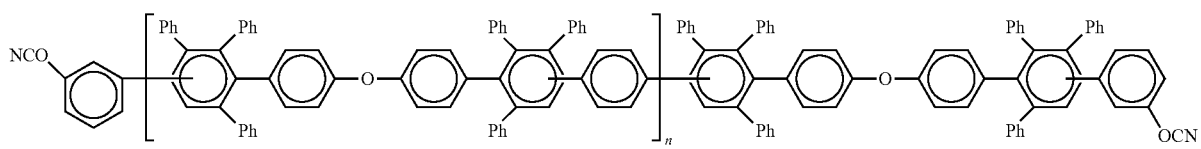

Chemical Structure 24:
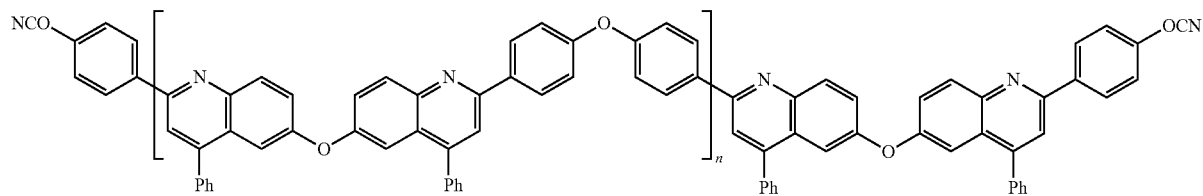
Chemical Structure 25:
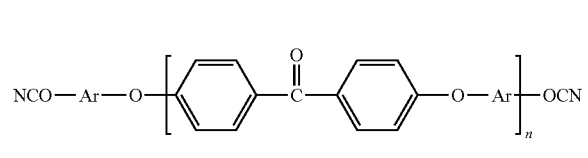
Chemical Structure 26:
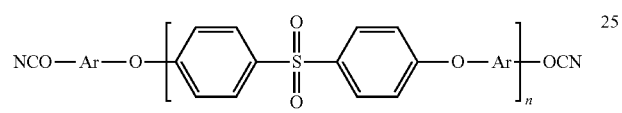
Where for Chemical Structures 25 and 26:
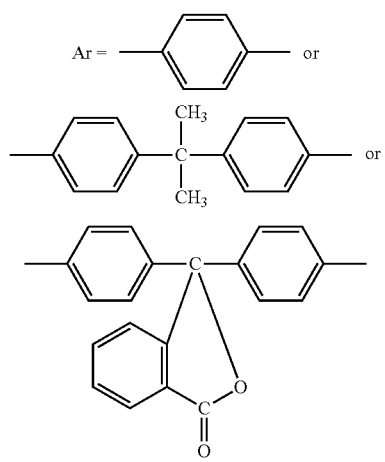
Chemical Structure 27:
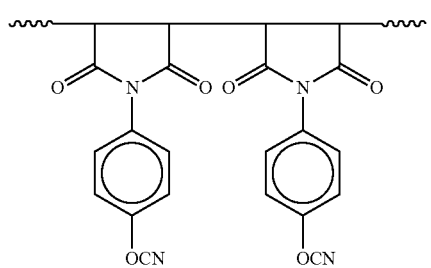
Chemical Structure 28:
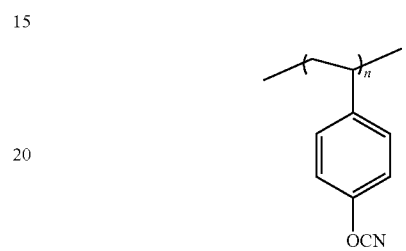
Chemical Structure 29:
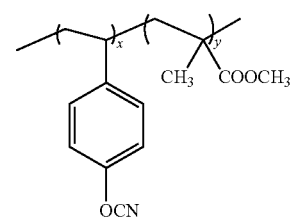
Chemical Structure 30:
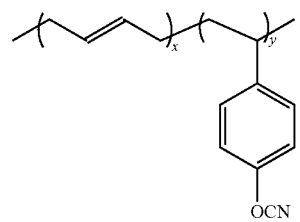
Chemical Structure 31:
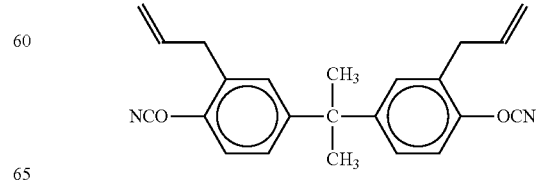

Chemical Structure 32:
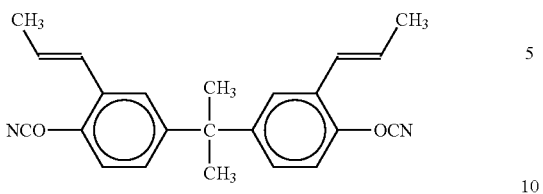
Chemical Structure 33:
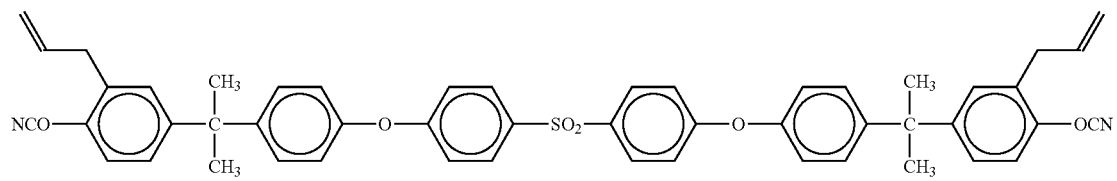
Chemical Structure 34:
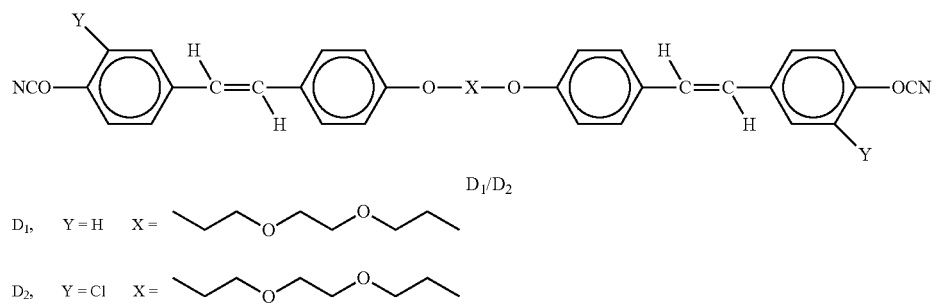
Chemical Structure 35:
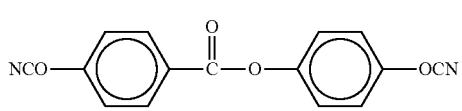
Chemical Structure 36:
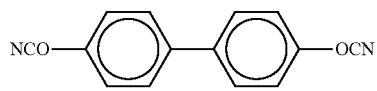
Chemical Structure 37:
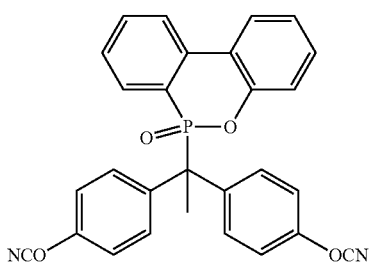
Chemical Structure 38:
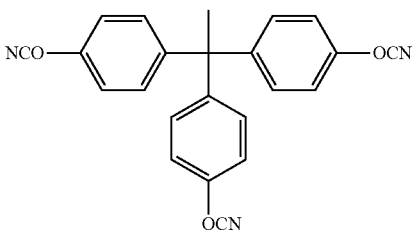

Chemical Structure 39:
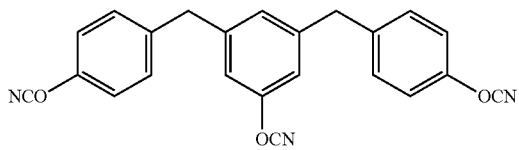
Chemical Structure 40:
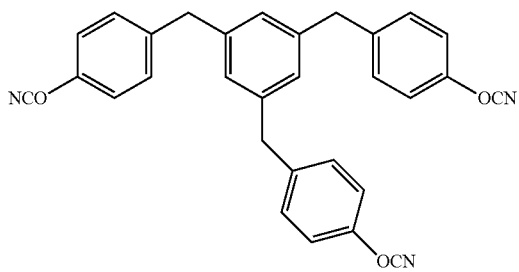
Chemical Structure 41:
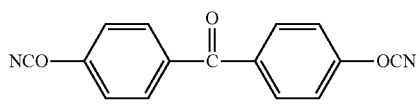
Chemical Structure 42:
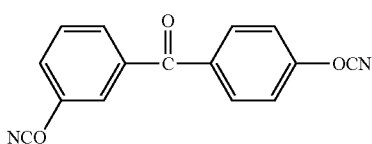
Chemical Structure 43:
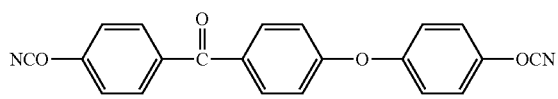
Chemical Structure 44:
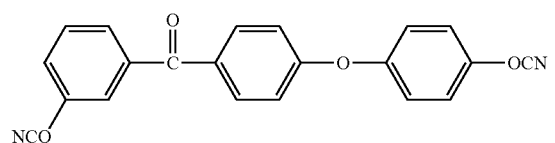
Chemical Structure 45:
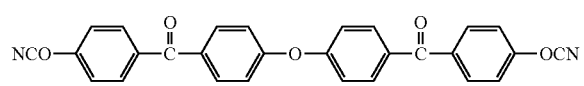
Chemical Structure 46:
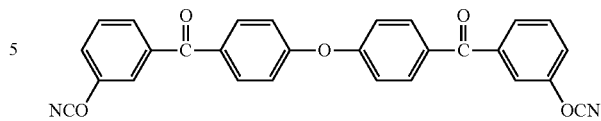
Chemical Structure 47:
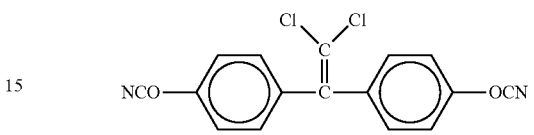
Chemical Structure 48:
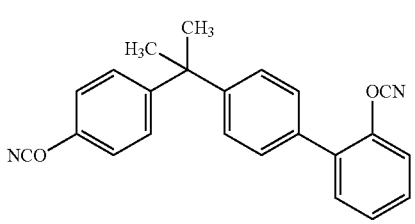
Chemical Structure 49:
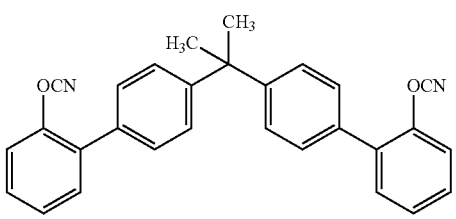
Chemical Structure 50:
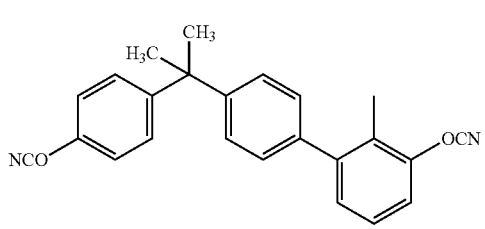
Chemical Structure 51:
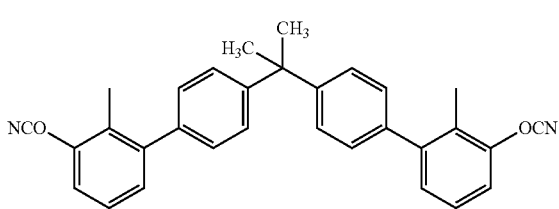

Chemical Structure 52:

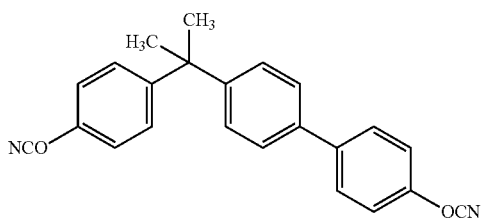

Chemical Structure 53:

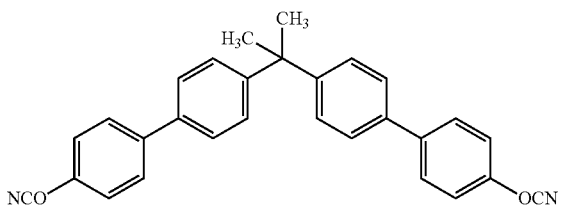

Chemical Structure 54:

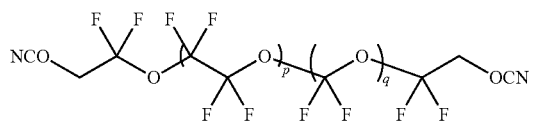

Chemical Structure 55:

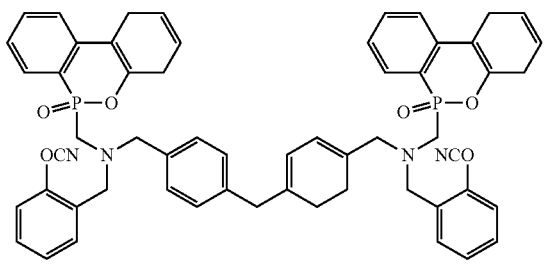

Chemical Structure 56:

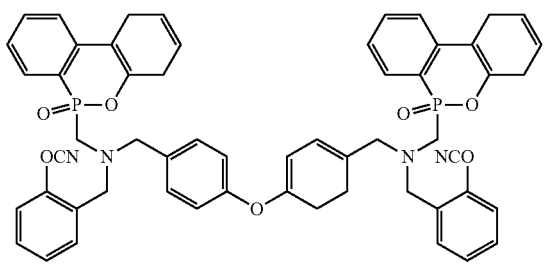

In one or more embodiments, cyanate esters may be synthesized from phenols and cyanogen halide, in the presence of a tertiary amine at low temperatures. Chemical Reaction Scheme A, below, represents one embodiment of such a reaction.

Chemical Reaction Scheme A

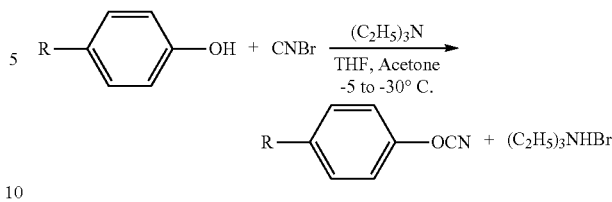

According to embodiments described herein, polycyanurate may be formed by curing (e.g., by heating) cyanate esters. The heating needed for curing may be relatively mild, such as less than 230° C. A generalized curing reaction to form polycyanurate from cyanate esters is depicted in Chemical Reaction Scheme B, below. During curing process, triazine rings are formed by cyclotrimerization of three cyanate ester groups (—OCN) to yield highly cross-linked polycyanurate polymeric network. The reaction generally does not produce any side products. Additionally, the reaction does not release toxic compound like HCN which may be harmful to the environment and/or persons coming into contact with such a substance. Therefore, cyclotrimerization of cyanate esters, as is shown in Chemical Reaction Scheme B, can be classified in the category of green chemistry and click chemistry. For example, the curing does not form water, such as in some other polymerization reactions. In additional embodiments, such curing may be less corrosive to processing equipment and/or may exhibit less post-curing shrinkage.

Chemical Reaction Scheme B

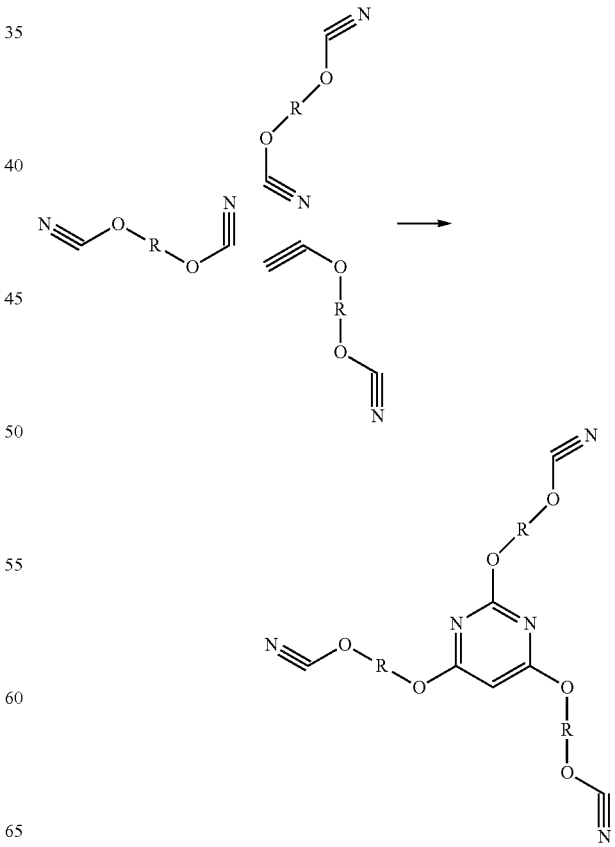

In additional embodiments, the polycyanurate may be functionalized by additional reagents or may be a polymer formed from a mixture of cyanate ester and other polymers. For example, cyanate esters may react with many other groups or reagents like water, phenols, epoxy, etc. For example, co-curing cyanate ester with epoxy may be used to form the polycyanurate. The co-reaction of cyanate ester and epoxy can result in a product whose water resistance and dielectric properties are improved compared to that of a homopolymer formed from of cyanate ester or epoxy. Such co-cured polycyanurates are described in "J. Bauer & M. Bauer (1990) Kinetic Structural Model for the Network Build-Up During the Reaction of Cyanic Acid Esters with Glycidyl Ethers, Journal of Macromolecular Science: Part A—Chemistry, 27:1, 97-116" and "Shimp, D A, H. F., Ising S J., Co-reaction of epoxide and cyanate resins. 33rd Int SAMPE Symp 1988, 33, 754-766," the teachings of both of which are incorporated by reference herein. Cyanate esters may be co-cured or blended with other types of monomers, such as epoxides, phenols, imides, alkenes and acrylates, to form interpenetrating networks (IPNs) or semi-IPNs, to further modify film properties and curing kinetics.

According to additional embodiments, cyanate esters may be co-blended with bismaleimide (BMI). Such a blend may combine good mechanical properties of cyanate ester and good heat resistant property of BMI. In addition to BMI, derivatives of BMI may also be used as a blending partner for cyanate ester modification to improve its performance.

In one embodiment, the coating 120 may be applied as an uncured coating precursor mixture, and then subsequently cured. The "coating precursor mixture" refers to the liquid solution which contains the cyanate esters or other precursors of the cured polycyanurate material which is applied to the glass body 102. In some embodiments, the coating precursor mixture will include one or more organic solvents along with the polymer precursor (e.g., cyanate ester). The coating precursor mixture may include one or more chemical constituents that contain material which will become a constituent in the coating 120 following application and curing of the coated glass container 100 (e.g., by spray or dip coating, followed by heating). That is, at least some of the atoms of the precursor will become the atoms of the formed coating. In additional embodiments, prepolymers or even fully polymerized polycyanurate may be included in the coating precursor mixture.

Referring again to FIGS. 1 and 2, the coating 120 may be applied in a single deposition step where the coating 120 comprises a single layer. Deposition may be by a submersion process, or alternatively, the coating 120 may be applied by a spray or other suitable means, and optionally dried. A description of suitable deposition methods for the coatings 120 described herein may be found in U.S. patent application Ser. No. 13/780,740 entitled "Glass Articles with Low-Friction Coatings," which is incorporated by reference in its entirety herein. In additional embodiments, multiple depositions may be utilized. For example, multiple coating precursor mixture depositions may be performed and then cured, or curing may follow each deposition step, such that a second coating of precursor is applied onto a cured layer. It should be understood that the deposition technique may depend on the geometry of the glass article.

Following deposition of the coating precursor mixture, at least a portion of the organic solvent of the coating precursor mixture is liberated, either by passive drying or by active drying step(s) such as controlled air flow or increased temperatures. The coated glass containers 100 may then be cured by exposure to heat. As described herein, "curing" refers to any process (usually by heating) which changes the material on the coating from the precursor material to an intermediate or final material. For example, some embodiments utilize a curing by heating which liberates constituents from the metal oxide precursor and forms the metal oxide. Such curing may comprise heating the coated vial at temperature sufficient to polymerize the polycyanurate, such as from 200° C. to 230° C. Curing conditions may depend on the type of precursor materials utilized. Without being bound by theory, it is believed that the curing step liberates any remaining solvents of the coating precursor mixture.

The coating 120 applied to the glass body 102 may have a thickness of less than or equal to about 100 μm, less than or equal to about 10 μm, less than or equal to about 8 μm, less than or equal to about 6 μm, less than or equal to about 4 μm, less than or equal to about 3 μm, less than or equal to about 2 μm, or even less than or equal to about 1 μm. In some embodiments, the thickness of the coating 120 may be less than or equal to about 800 nm, less than or equal to about 600 nm, less than or equal to about 400 nm, less than or equal to 300 nm, less than or equal to about 200 nm, or even less than or equal to about 100 nm thick. In other embodiments, the coating 120 may be less than about 90 nm thick, less than about 80 nm thick, less than about 70 nm thick, less than about 60 nm thick, less than about 50 nm thick, or even less than about 25 nm thick. In embodiments, the coating 120 may have a thickness of at least about 10 nm, at least about 15 nm, at least about 20 nm, at least about 25 nm, at least about 30 nm, at least about 35 nm, at least about 40 nm, or even at least about 45 nm. Exemplary embodiments may have a thickness of from about 20 nm to about 50 nm, from about 25 nm to about 45 nm, or from about 30 nm to about 40 nm. Without being bound by theory, it is believed that relatively thin coatings (i.e., less than 20 nm) may not adequately protect the glass, resulting in checking on the glass surface during vial-to-vial contact. In addition such relatively thin coatings may not survive a depyrogenation process. On the other hand, relatively thick coatings (i.e., greater than 50 nm) may be more easily damaged and wear tracks in the coating may appear from vial-on-vial contacting. It should be noted that in the case of the relatively thick coatings, the wear tracks are believed to be deformations in the coating, and not in the glass. As described herein, wear tracks are visible tracks caused by abrasion on a coating, leaving a track or scuff. In some embodiments, wear tracks may signify glass checking and/or relatively high coefficient of friction (e.g., 0.7 or greater).

In some embodiments, the coating 120 may not be of uniform thickness over the entirety of the glass body 102. For example, the coated glass container 100 may have a thicker coating 120 in some areas, due to the process of contacting the glass body 102 with one or more coating solutions that form the coating 120. In some embodiments, the coating 120 may have a non-uniform thickness. For example, the coating thickness may be varied over different regions of a coated glass container 100, which may promote protection in a selected region.

Several non-limiting advantages of the presently disclosed polycyanurate coatings with respect to other polymer-based coatings for pharmaceutical packages may be observed. One such advantage may be reduced coefficient of friction. For example, coefficient of friction of less than 0.2, such as about 0.1, have been observed in the presently disclosed embodiments. Additionally or alternatively, cyanate esters may provide improved adhesion on glass surface due to stronger physical interactions and chemical reactions between cyanate ester and surface silanol of glass.

In contrast, polyimide coatings may need amino-functionalized alkoxy silane as coupling agent to enhance coating adhesion, which add cost and processing difficulties. Additionally or alternatively, cyanate esters, especially F-DCBA, and their prepolymers are readily soluble in various environmentally benign organic solvents of low boiling point, while the precursors of other coating systems, such as polyimide coatings, may need to be dissolved in very high boiling point solvents, such as polyamic acid Novastrat 800 in toluene/DMF, and PMDA-ODA (poly(4,4'-oxydiphenylene-pyromellitimide) in NMP.

In additional embodiments, the crosslinking reaction of cyanate esters to from polycyanurates can be classified in the category of 'click chemistry', which produces no side-products, nor needs additional reagents to facilitate formation of the crosslinked products, triazine rings. This may be a substantial advantage as compared to crosslinking methodologies based on poly-condensations, such as imide polymerization and silane curing on glass. In general, poly-condensation forms $H_2O$, while silane curing may liberate MeOH or EtOH. These side products may impede polymerization/curing rate because they push chemical equilibrium backwards to starting materials.

An additional advantage may include the aspect that the precursors of polycyanurate coatings, cyanate esters and oligomeric triazines (such as in prepolymers of polycyanurate), are readily soluble in commonly used, environmental benign solvents, such as ketones, esters and ethers. In comparison, high temperature thermal plastics, such as PEEK and PPSU, are more difficult to dissolve in solvents at mild temperatures, and therefore may not be useful for solution-based, thin-film coating processes.

Additionally or alternatively to other embodiments presently disclosed, the coatings comprising polycyanurate may be substantially clear for film thickness of up to 1 micron. This provides a relatively wide processing window if transparency is desired.

In additional embodiments, the presently disclosed coatings 120, which include polycyanurate, may be an amorphous material due to its triazine-ring functionalities formed during thermal curing process. This may provide the coating 120 with good anisotropic behaviors in terms of physical and chemical properties, as well as good post-curing dimensional stability.

The glass containers of the pharmaceutical packages, to which the coating 120 may be applied, may be formed from a variety of different glass compositions. The specific composition of the glass article may be selected according to the specific application such that the glass has a desired set of physical properties. According to one or more embodiments, the glass may be a composition which is known to exhibit chemical durability and low thermal expansion, such as alkali borosilicate glasses. According to another embodiment, the glass container may be formed from a Type I, Class B glass according to ASTM Standard E438-92.

The glass containers may be formed from a glass composition which has a coefficient of thermal expansion in the range from about $25 \times 10^{-7}/°C$. to $80 \times 10^{-7}/°C$. For example, in some embodiments described herein, the glass body 102 is formed from alkali aluminosilicate glass compositions which are amenable to strengthening by ion exchange. Such compositions generally include a combination of $SiO_2$, $Al_2O_3$, at least one alkaline earth oxide, and one or more alkali oxides, such as $Na_2O$ and/or $K_2O$. In some of these embodiments, the glass composition may be free from boron and compounds containing boron. In some other embodiments, the glass compositions may further comprise minor amounts of one or more additional oxides such as, for example, $SnO_2$, $ZrO_2$, $ZnO$, $TiO_2$, $As_2O_3$, or the like. These components may be added as fining agents and/or to further enhance the chemical durability of the glass composition. In another embodiment, the glass surface may comprise a metal oxide coating comprising $SnO_2$, $ZrO_2$, $ZnO$, $TiO_2$, $As_2O_3$, or the like.

In some embodiments described herein, the glass body 102 is strengthened such as by ion-exchange strengthening, herein referred to as "ion-exchanged glass." For example, the glass body 102 may have a compressive stress of greater than or equal to about 300 MPa or even greater than or equal to about 350 MPa. In some embodiments, the compressive stress may be in a range from about 300 MPa to about 900 MPa. However, it should be understood that, in some embodiments, the compressive stress in the glass may be less than 300 MPa or greater than 900 MPa. In some embodiments, the glass body 102 may have a depth of layer greater than or equal to 20 μm. In some of these embodiments, the depth of layer may be greater than 50 μm or even greater than or equal to 75 μm. In still other embodiments, the depth of the layer may be up to or greater than 100 μm. The ion-exchange strengthening may be performed in a molten salt bath maintained at temperatures from about 350° C. to about 500° C. To achieve the desired compressive stress, the glass container (uncoated) may be immersed in the salt bath for less than about 30 hours or even less than about 20 hours. For example, in one embodiment the glass container is immersed in a 100% $KNO_3$ salt bath at 450° C. for about 8 hours.

In one particularly exemplary embodiment, the glass body 102 may be formed from an ion exchangeable glass composition described in pending U.S. patent application Ser. No. 13/660,894 filed Oct. 25, 2012, and entitled "Glass Compositions with Improved Chemical and Mechanical Durability" assigned to Corning, Incorporated.

However it should be understood that the coated glass containers 100 described herein may be formed from other glass compositions including, without limitation, ion-exchangeable glass compositions and non-ion exchangeable glass compositions. For example, in some embodiments the glass container may be formed from Type 1B glass compositions such as, for example, Schott Type 1B borosilicate glass.

In some embodiments described herein, the glass article may be formed from a glass composition which meets the criteria for pharmaceutical glasses described by regulatory agencies such as the USP (United States Pharmacopoeia), the EP (European Pharmacopeia), and the JP (Japanese Pharmacopeia) based on their hydrolytic resistance. Per USP 660 and EP 7, borosilicate glasses meet the Type I criteria and are routinely used for parenteral packaging. Examples of borosilicate glass include, but are not limited to, Corning® Pyrex® 7740, 7800 and Wheaton 180, 200, and 400, Schott Duran, Schott Fiolax, KIMAX® N-51A, Gerrescheimer GX-51 Flint and others. Soda-lime glass meets the Type III criteria and is acceptable in packaging of dry powders which are subsequently dissolved to make solutions or buffers. Type III glasses are also suitable for packaging liquid formulations that prove to be insensitive to alkali. Examples of Type III soda lime glass include Wheaton 800 and 900. De-alkalized soda-lime glasses have higher levels of sodium hydroxide and calcium oxide and meet the Type II criteria. These glasses are less resistant to leaching than Type I glasses but more resistant than Type III glasses. Type II glasses can be used for products that remain below a pH of 7 for their shelf life. Examples include ammonium sulfate treated soda lime glasses. These pharmaceutical glasses have varied chemical compositions and have a coefficient of linear thermal expansion (CTE) in the range of $20\text{-}85 \times 10^{-7}/°\text{C}$.

When the coated glass articles described herein are glass containers, the glass body 102 of the coated glass containers 100 may take on a variety of different forms. For example, the glass bodies described herein may be used to form coated glass containers 100 such as vials, ampoules, cartridges, syringe bodies and/or any other glass container for storing pharmaceutical compositions. Moreover, the ability to chemically strengthen the glass containers prior to coating can be utilized to further improve the mechanical durability of the glass containers. Accordingly, it should be understood that, in at least one embodiment, the glass containers may be ion exchange strengthened prior to application of the coating. Alternatively, other strengthening methods such as heat tempering, flame polishing, and laminating, as described in U.S. Pat. No. 7,201,965, could be used to strengthen the glass before coating.

Various properties of the coated glass containers (i.e., coefficient of friction, horizontal compression strength, 4-point bend strength) may be measured when the coated glass containers are in an as-coated condition (i.e., following application of the coating without any additional treatments other than curing if applicable) or following one or more processing treatments, such as those similar or identical to treatments performed on a pharmaceutical filling line, including, without limitation, washing, lyophilization, depyrogenation, autoclaving, or the like.

Depyrogenation is a process wherein pyrogens are removed from a substance. Depyrogenation of glass articles, such as pharmaceutical packages, can be performed by a thermal treatment applied to a sample in which the sample is heated to an elevated temperature for a period of time. For example, depyrogenation may include heating a glass container to a temperature of between about 250° C. and about 380° C. for a time period from about 30 seconds to about 72 hours, including, without limitation, 20 minutes, 30 minutes, 40 minutes, 1 hour, 2 hours, 4 hours, 8 hours, 12 hours, 24 hours, 48 hours, and 72 hours. Following the thermal treatment, the glass container is cooled to room temperature. One conventional depyrogenation condition commonly employed in the pharmaceutical industry is thermal treatment at a temperature of about 250° C. for about 30 minutes. However, it is contemplated that the time of thermal treatment may be reduced if higher temperatures are utilized. The coated glass containers, as described herein, may be exposed to elevated temperatures for a period of time. The elevated temperatures and time periods of heating described herein may or may not be sufficient to depyrogenate a glass container. However, it should be understood that some of the temperatures and times of heating described herein are sufficient to depyrogenate a coated glass container, such as the coated glass containers described herein. For example, as described herein, the coated glass containers may be exposed to temperatures of about 250° C., about 260° C., about 270° C., about 280° C., about 290° C., about 300° C., about 310° C., about 320° C., about 330° C., about 340° C., about 350° C., about 360° C., about 370° C., about 380° C., about 390° C., or about 400° C., for a period of time of 30 minutes. It is recognized that depyrogenation processes may have times other than 30 minutes, and 30 minutes is used throughout this disclosure with a depyrogenation temperature for comparative purposes such as, for example, coefficient of friction testing following exposure to a defined depyrogenation condition.

As used herein, lyophilization conditions (i.e., freeze drying) refer to a process in which a sample is filled with a liquid that contains protein and then frozen at low temperatures, such as −100° C., followed by water sublimation for a time such as 20 hours at a temperatures such as −15° C. under vacuum.

As used herein, autoclave conditions refer to steam purging a sample for a time period such as 10 minutes at 100° C., followed by a 20 minute dwelling period wherein the sample is exposed to a 121° C. environment, followed by 30 minutes of heat treatment at 121° C.

The coefficient of friction ($\mu$) of the portion of the coated glass container with the coating may have a lower coefficient of friction than a surface of an uncoated glass container formed from a same glass composition. A coefficient of friction ($\mu$) is a quantitative measurement of the friction between two surfaces and is a function of the mechanical and chemical properties of the first and second surfaces, including surface roughness, as well as environmental conditions such as, but not limited to, temperature and humidity. As used herein, a coefficient of friction measurement for coated glass container 100 is reported as the coefficient of friction between the outer surface of a first glass container (having an outer diameter of between about 16.00 mm and about 17.00 mm) and the outer surface of second glass container which is substantially identical to the first glass container, wherein the first and second glass containers have the same body and the same coating composition (when applied) and have been exposed to the same environments prior to fabrication, during fabrication, and after fabrication. Unless otherwise denoted herein, the coefficient of friction refers to the maximum coefficient of friction measured with a normal load of 30 N measured on a vial-on-vial testing jig, as described herein. However, it should be understood that a coated glass container which exhibits a maximum coefficient of friction at a specific applied load will also exhibit the same or better (i.e., lower) maximum coefficient of friction at a lesser load. For example, if a coated glass container exhibits a maximum coefficient of friction of 0.5 or lower under an applied load of 50 N, the coated glass container will also exhibit a maximum coefficient of friction of 0.5 or lower under an applied load of 25 N. To measure a maximum coefficient of friction, local maxima at or near the beginning of the test are excluded, as such maxima at or near the beginning of the test represent static coefficient of friction. As described in the embodiments herein, the coefficient of friction was measured where the speed of the containers relative to one another was about 0.67 mm/s.

Figure 3:
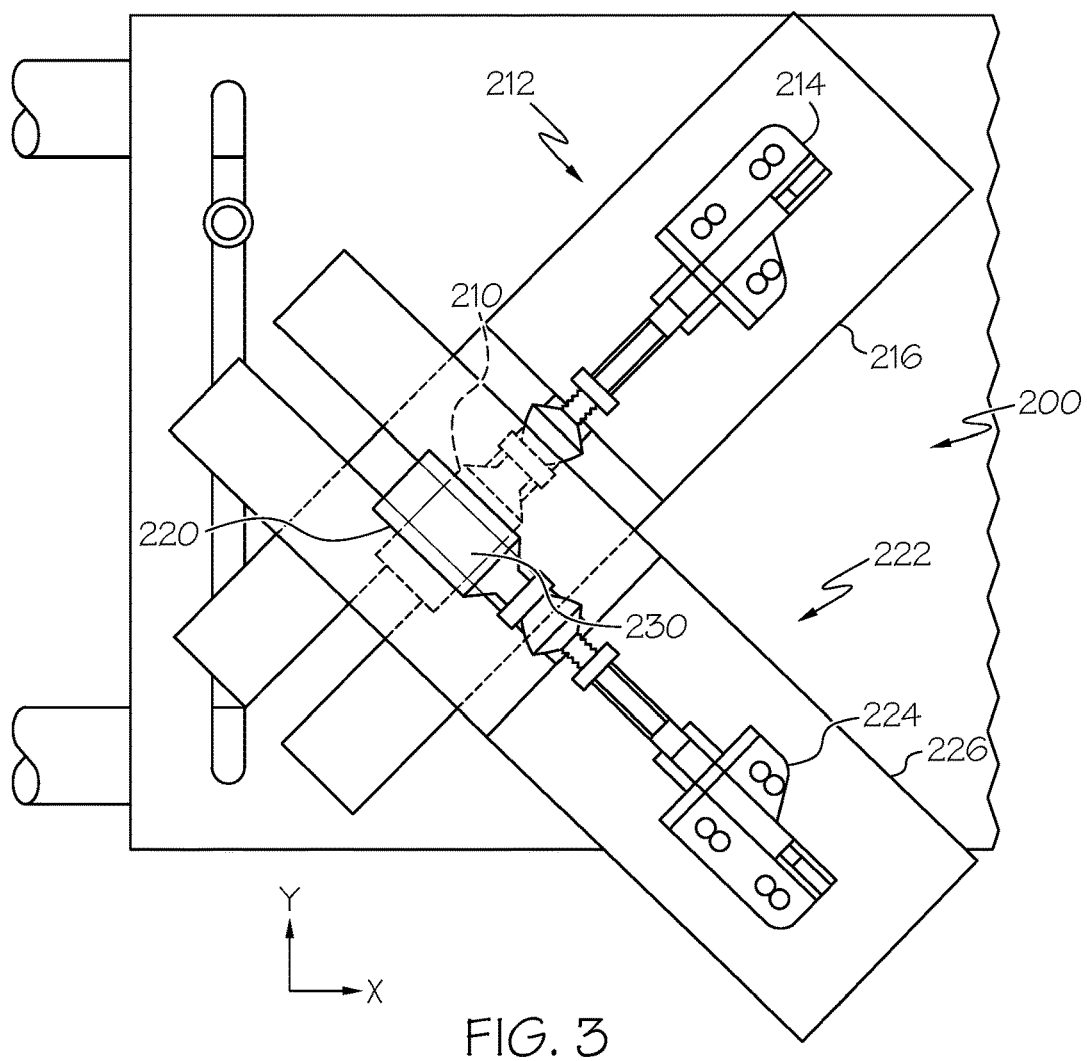
FIG. 3 schematically depicts a testing jig for determining the coefficient of friction between two surfaces, according to one or more embodiments shown and described herein.

In the embodiments described herein, the coefficient of friction of the glass containers (both coated and uncoated) is measured with a vial-on-vial testing jig. The testing jig 200 is schematically depicted in FIG. 3. The same apparatus may also be used to measure the frictive force between two glass containers positioned in the jig. The vial-on-vial testing jig 200 comprises a first clamp 212 and a second clamp 222 arranged in a cross configuration (i.e., perpendicular to one another). The first clamp 212 comprises a first securing arm 214 attached to a first base 216. The first securing arm 214 attaches to the first glass container 210 and holds the first glass container 210 stationary relative to the first clamp 212. Similarly, the second clamp 222 comprises a second securing arm 224 attached to a second base 226. The second securing arm 224 attaches to the second glass container 220 and holds it stationary relative to the second clamp 222. The first glass container 210 is positioned on the first clamp 212 and the second glass container 220 is positioned of the second clamp 222 such that the long axis of the first glass container 210 and the long axis of the second glass container 220 are positioned at about a 90° angle relative to one another and on a horizontal plane defined by the x-y axis.

A first glass container 210 is positioned in contact with the second glass container 220 at a contact point 230. A normal force is applied in a direction orthogonal to the horizontal plane defined by the x-y axis. The normal force may be applied by a static weight or other force applied to the second clamp 222 upon a stationary first clamp 212. For example, a weight may be positioned on the second base 226 and the first base 216 may be placed on a stable surface, thus inducing a measurable force between the first glass container 210 and the second glass container 220 at the contact point 230. Alternatively, the force may be applied with a mechanical apparatus, such as a UMT (universal mechanical tester) machine.

The first clamp 212 or second clamp 222 may be moved relative to the other in a direction which is at a 45° angle with the long axis of the first glass container 210 and the second glass container 220. For example, the first clamp 212 may be held stationary and the second clamp 222 may be moved such that the second glass container 220 moves across the first glass container 210 in the direction of the x-axis. A similar setup is described by R. L. De Rosa et al., in "Scratch Resistant Polyimide Coatings for Alumino Silicate Glass surfaces" in The Journal of Adhesion, 78: 113-127, 2002. To measure the coefficient of friction, the force required to move the second clamp 222 and the normal force applied to first and second glass containers 210, 220 are measured with load cells and the coefficient of friction is calculated as the quotient of the frictive force and the normal force. The jig is operated in an environment of 25° C. and 50% relative humidity.

In the embodiments described herein, the portion of the coated glass container with the coating has a coefficient of friction of less than or equal to about 0.7 relative to a like-coated glass container, as determined with the vial-on-vial jig described above. In other embodiments, the coefficient of friction may be less than or equal to about 0.6, or even less than or equal to about 0.5. In some embodiments, the portion of the coated glass container with the coating has a coefficient of friction of less than or equal to about 0.4 or even less than or equal to about 0.3. Coated glass containers with coefficients of friction less than or equal to about 0.7 generally exhibit improved resistance to frictive damage and, as a result, have improved mechanical properties. For example, conventional glass containers (without a coating) may have a coefficient of friction of greater than 0.7.

In some embodiments described herein, the coefficient of friction of the portion of the coated glass container with the coating is at least 20% less than a coefficient of friction of a surface of an uncoated glass container formed from a same glass composition. For example, the coefficient of friction of the portion of the coated glass container with the coating may be at least 20% less, at least 25% less, at least 30% less, at least 40% less, or even at least 50% less than a coefficient of friction of a surface of an uncoated glass container formed from a same glass composition.

In some embodiments, the portion of the coated glass container with the coating may have a coefficient of friction of less than or equal to about 0.7 after exposure to a temperature of about 250° C., about 260° C., about 270° C., about 280° C., about 290° C., about 300° C., about 310° C., about 320° C., about 330° C., about 340° C., about 350° C., about 360° C., about 370° C., about 380° C., about 390° C., or about 400° C., for a period of time of 30 minutes. In other embodiments, the portion of the coated glass container with the coating may have a coefficient of friction of less than or equal to about 0.7, (i.e., less than or equal to about 0.6, less than or equal to about 0.5, less than or equal to about 0.4, or even less than or equal to about 0.3) after exposure to a temperature of about 250° C., about 260° C., about 270° C., about 280° C., about 290° C., about 300° C., about 310° C., about 320° C., about 330° C., about 340° C., about 350° C., about 360° C., about 370° C., about 380° C., about 390° C., or about 400° C., for a period of time of 30 minutes. In some embodiments, the coefficient of friction of the portion of the coated glass container with the coating may not increase by more than about 30% after exposure to a temperature of about 250° C. (or about 260° C.) for 30 minutes. In other embodiments, coefficient of friction of the portion of the coated glass container with the coating may not increase by more than about 30% (i.e., about 25%, about 20%, about 15%, or even about 10%) after exposure to a temperature of about 250° C., about 260° C., about 270° C., about 280° C., about 290° C., about 300° C., about 310° C., about 320° C., about 330° C., about 340° C., about 350° C., about 360° C., about 370° C., about 380° C., about 390° C., or about 400° C., for a period of time of 30 minutes. In other embodiments, coefficient of friction of the portion of the coated glass container with the coating may not increase by more than about 0.5 (i.e., about 0.45, about 0.4, about 0.35, about 0.3, about 0.25, about 0.2, about 0.15, about 0.1, or even about 0.05) after exposure to a temperature of about 250° C., about 260° C., about 270° C., about 280° C., about 290° C., about 300° C., about 310° C., about 320° C., about 330° C., about 340° C., about 350° C., about 360° C., about 370° C., about 380° C., about 390° C., or about 400° C., for a period of time of 30 minutes. In some embodiments, the coefficient of friction of the portion of the coated glass container with the coating may not increase at all after exposure to a temperature of about 250° C., about 260° C., about 270° C., about 280° C., about 290° C., about 300° C., about 310° C., about 320° C., about 330° C., about 340° C., about 350° C., about 360° C., about 370° C., about 380° C., about 390° C., or about 400° C., for a period of time of 30 minutes.

In some embodiments, the portion of the coated glass container with the coating may have a coefficient of friction of less than or equal to about 0.7 after being submerged in a water bath at a temperature of about 70° C. for 10 minutes. In other embodiments, the portion of the coated glass container with the coating may have a coefficient of friction of less than or equal to about 0.7, (i.e., less than or equal to about 0.6, less than or equal to about 0.5, less than or equal to about 0.4, or even less than or equal to about 0.3) after being submerged in a water bath at a temperature of about 70° C. for 5 minutes, 10 minutes, 20 minutes, 30 minutes, 40 minutes, 50 minutes, or even 1 hour. In some embodiments, the coefficient of friction of the portion of the coated glass container with the coating may not increase by more than about 30% after being submerged in a water bath at a temperature of about 70° C. for 10 minutes. In other embodiments, coefficient of friction of the portion of the coated glass container with the coating may not increase by more than about 30% (i.e., about 25%, about 20%, about 15%, or event about 10%) after being submerged in a water bath at a temperature of about 70° C. for 5 minutes, 10 minutes, 20 minutes, 30 minutes, 40 minutes, 50 minutes, or even 1 hour. In some embodiments, the coefficient of friction of the portion of the coated glass container with the coating may not increase at all after being submerged in a water bath at a temperature of about 70° C. for 5 minutes, 10 minutes, 20 minutes, 30 minutes, 40 minutes, 50 minutes, or even 1 hour.

In some embodiments, the portion of the coated glass container with the coating may have a coefficient of friction of less than or equal to about 0.7 after exposure to lyophilization conditions. In other embodiments, the portion of the coated glass container with the coating may have a coefficient of friction of less than or equal to about 0.7, (i.e., less than or equal to about 0.6, less than or equal to about 0.5, less than or equal to about 0.4, or even less than or equal to about 0.3) after exposure to lyophilization conditions. In some embodiments, the coefficient of friction of the portion of the coated glass container with the coating may not increase by more than about 30% after exposure to lyophilization conditions. In other embodiments, coefficient of friction of the portion of the coated glass container with the coating may not increase by more than about 30% (i.e., about 25%, about 20%, about 15%, or event about 10%) after exposure to lyophilization conditions. In some embodiments, the coefficient of friction of the portion of the coated glass container with the coating may not increase at all after exposure to lyophilization conditions.

In some embodiments, the portion of the coated glass container with the coating may have a coefficient of friction of less than or equal to about 0.7 after exposure to autoclave conditions. In other embodiments, the portion of the coated glass container with the coating may have a coefficient of friction of less than or equal to about 0.7, (i.e., less than or equal to about 0.6, less than or equal to about 0.5, less than or equal to about 0.4, or even less than or equal to about 0.3) after exposure to autoclave conditions. In some embodiments, the coefficient of friction of the portion of the coated glass container with the coating may not increase by more than about 30% after exposure to autoclave conditions. In other embodiments, coefficient of friction of the portion of the coated glass container with the coating may not increase by more than about 30% (i.e., about 25%, about 20%, about 15%, or event about 10%) after exposure to autoclave conditions. In some embodiments, the coefficient of friction of the portion of the coated glass container with the coating may not increase at all after exposure to autoclave conditions.

The coated glass containers described herein have a horizontal compression strength. The horizontal compression strength, as described herein, is measured by positioning the coated glass container 100 horizontally between two parallel platens which are oriented in parallel to the long axis of the glass container. A mechanical load is then applied to the coated glass container 100 with the platens in the direction perpendicular to the long axis of the glass container. Prior to being placed in the platens, the glass containers are wrapped in 2 inch tape, and the overhang is cut off or folded around the bottom of the container. The container is then positioned within an index card that is stapled around the specimen. The load rate for vial compression is 0.5 in/min, meaning that the platens move towards each other at a rate of 0.5 in/min. The horizontal compression strength is measured at 25° C.±2° C. and 50%±5% relative humidity. It is desirable, in some embodiments, to perform the horizontal compression test within 1 hour (and not more than 24 hours) following depyrogenation to simulate pharmaceutical filling line conditions. The horizontal compression strength is a measurement of load at failure, and measurement of the horizontal compression strength can be given as a failure probability at a selected normal compression load. As used herein, failure occurs when the glass container ruptures under a horizontal compression in least 50% of samples. Thus, the horizontal compression is provided for a group of samples. In some embodiments, a coated glass container may have a horizontal compression strength at least 10%, 20%, or 30% greater than an uncoated vial.

Referring now to FIGS. 1 and 3, the horizontal compression strength measurement may also be performed on an abraded glass container. Specifically, operation of the testing jig 200 may create damage on the coated glass container outer surface 122, such as a surface scratch or abrasion that weakens the strength of the coated glass container 100. The glass container is then subjected to the horizontal compression procedure described above, wherein the container is placed between two platens with the scratch pointing outward parallel to the platens. The scratch can be characterized by the selected normal pressure applied by a vial-on-vial jig and the scratch length. Unless identified otherwise, scratches for abraded glass containers for the horizontal compression procedure are characterized by a scratch length of 20 mm created by a normal load of 30 N. It may be desired to have the scratch at a 90° angle relative to the platens, ±5°.

The coated glass containers can be evaluated for horizontal compression strength following a heat treatment. The heat treatment may be exposure to a temperature of about 250° C., about 260° C., about 270° C., about 280° C., about 290° C., about 300° C., about 310° C., about 320° C., about 330° C., about 340° C., about 350° C., about 360° C., about 370° C., about 380° C., about 390° C., or about 400° C., for a period of time of 30 minutes. In some embodiments, the horizontal compression strength of the coated glass container is not reduced by more than about 20%, 30%, or even 40% after being exposed to a heat treatment, such as those described above, and then being abraded, as described above. In one embodiment, the horizontal compression strength of the coated glass container is not reduced by more than about 20% after being exposed to a heat treatment of about 250° C., about 260° C., about 270° C., about 280° C., about 290° C., about 300° C., about 310° C., about 320° C., about 330° C., about 340° C., about 350° C., about 360° C., about 370° C., about 380° C., about 390° C., or about 400° C., for a period of time of 30 minutes, and then being abraded.

The coated glass articles described herein may be thermally stable after heating to a temperature of at least 250° C. (or 260° C., or 280° C., or 300° C.) for a time period of 30 minutes. The phrase "thermally stable," as used herein, means that the coating applied to the glass article remains substantially intact on the surface of the glass article after exposure to the elevated temperatures such that, after exposure, the mechanical properties of the coated glass article, specifically the coefficient of friction and the horizontal compression strength, are only minimally affected, if at all. This indicates that the coating remains adhered to the surface of the glass following elevated temperature exposure and continues to protect the glass article from mechanical insults such as abrasions, impacts and the like.

In the embodiments described herein, a coated glass article is considered to be thermally stable if the coated glass article meets both a coefficient of friction standard and a horizontal compression strength standard after heating to the specified temperature and remaining at that temperature for the specified time. To determine if the coefficient of friction standard is met, the coefficient of friction of a first coated glass article is determined in as-received condition (i.e., prior to any thermal exposure) using the testing jig depicted in FIG. 3 and a 30 N applied load. A second coated glass article (i.e., a glass article having the same glass composition and the same coating composition as the first coated glass article) is thermally exposed under the prescribed conditions and cooled to room temperature. Thereafter, the coefficient of friction of the second glass article is determined using the testing jig depicted in FIG. 3 to abrade the coated glass article with a 30 N applied load resulting in an abrasion (i.e., a "scratch") having a length of approximately 20 mm. If the coefficient of friction of the second coated glass article is less than 0.7 and the surface of the glass of the second glass article in the abraded area does not have any observable damage, then the coefficient of friction standard is met for purposes of determining the thermal stability of the coating. The term "observable damage," as used herein means that the surface of the glass in the abraded area of the glass article contains less than six glass checks per 0.5 cm of length of the abraded area when observed with a Nomarski or differential interference contrast (DIC) spectroscopy microscope at a magnification of 100× with LED or halogen light sources. A standard definition of a glass check or glass checking is described in G. D. Quinn, "NIST Recommended Practice Guide: Fractography of Ceramics and Glasses," NIST special publication 960-17 (2006).

To determine if the horizontal compression strength standard is met, a first coated glass article is abraded in the testing jig depicted in FIG. 3 under a 30 N load to form a 20 mm scratch. The first coated glass article is then subjected to a horizontal compression test, as described herein, and the retained strength of the first coated glass article is determined. A second coated glass article (i.e., a glass article having the same glass composition and the same coating composition as the first coated glass article) is thermally exposed under the prescribed conditions and cooled to room temperature. Thereafter, the second coated glass article is abraded in the testing jig depicted in FIG. 3 under a 30 N load. The second coated glass article is then subjected to a horizontal compression test, as described herein, and the retained strength of the second coated glass article is determined. If the retained strength of the second coated glass article does not decrease by more than about 20% relative to the first coated glass article (i.e., the load to failure does not decrease by more than 20%), then the horizontal compression strength standard is met for purposes of determining the thermal stability of the coating.

The coated glass containers are considered to be thermally stable if the coefficient of friction standard and the horizontal compression strength standard are met after exposing the coated glass containers to a temperature of at least about 250° C. (or 260° C. or 280° C.) for a time period of at least about 30 minutes (i.e., the coated glass containers are thermally stable at a temperature of at least about 250° C. (or 260° C. or 280° C.) for a time period of about 30 minutes). The thermal stability may also be assessed at temperatures from about 250° C. (or 260° C. or 280° C.) up to about 400° C. For example, in some embodiments, the coated glass containers will be considered to be thermally stable if the standards are met at a temperature of at least about 270° C. or even about 280° C. for a time period of about 30 minutes. In still other embodiments, the coated glass containers will be considered to be thermally stable if the standards are met at a temperature of at least about 290° C. or even about 300° C. for a time period of about 30 minutes. In further embodiments, the coated glass containers will be considered to be thermally stable if the standards are met at a temperature of at least about 310° C. or even about 320° C. for a time period of about 30 minutes. In still other embodiments, the coated glass containers will be considered to be thermally stable if the standards are met at a temperature of at least about 330° C. or even about 340° C. for a time period of about 30 minutes. In yet other embodiments, the coated glass containers will be considered to be thermally stable if the standards are met at a temperature of at least about 350° C. or even about 360° C. for a time period of about 30 minutes. In some other embodiments, the coated glass containers will be considered to be thermally stable if the standards are met at a temperature of at least about 370° C. or even about 380° C. for a time period of about 30 minutes. In still other embodiments, the coated glass containers will be considered to be thermally stable if the standards are met at a temperature of at least about 390° C. or even about 400° C. for a time period of about 30 minutes.

The coated glass containers disclosed herein may also be thermally stable over a range of temperatures, meaning that the coated glass containers are thermally stable by meeting the coefficient of friction standard and horizontal compression strength standard at each temperature in the range. For example, in the embodiments described herein, the coated glass containers may be thermally stable from at least about 250° C. (or 260° C. or 280° C.) to a temperature of less than or equal to about 400° C. In some embodiments, the coated glass containers may be thermally stable in a range from at least about 250° C. (or 260° C. or 280° C.) to about 350° C. In some other embodiments, the coated glass containers may be thermally stable from at least about 280° C. to a temperature of less than or equal to about 350° C. In still other embodiments, the coated glass containers may be thermally stable from at least about 290° C. to about 340° C. In another embodiment, the coated glass container may be thermally stable at a range of temperatures of about 300° C. to about 380° C. In another embodiment, the coated glass container may be thermally stable at a range of temperatures from about 320° C. to about 360° C.

The coated glass containers described herein have a four point bend strength. To measure the four point bend strength of a glass container, a glass tube that is the precursor to the coated glass container 100 is utilized for the measurement. The glass tube has a diameter that is the same as the glass container but does not include a glass container base or a glass container mouth (i.e., prior to forming the tube into a glass container). The glass tube is then subjected to a four point bend stress test to induce mechanical failure. The test is performed at 50% relative humidity with outer contact members spaced apart by 9" and inner contact members spaced apart by 3" at a loading rate of 10 mm/min.

The four point bend stress measurement may also be performed on a coated and abraded tube. Operation of the testing jig 200 may create an abrasion on the tube surface such as a surface scratch that weakens the strength of the tube, as described in the measurement of the horizontal compression strength of an abraded vial. The glass tube is then subjected to a four point bend stress test to induce mechanical failure. The test is performed at 25° C. and at 50% relative humidity using outer probes spaced apart by 9" and inner contact members spaced apart by 3" at a loading rate of 10 mm/min, while the tube is positioned such that the scratch is put under tension during the test.

In some embodiments, the four point bend strength of a glass tube with a coating after abrasion shows on average at least 10%, 20%, or even 50% higher mechanical strength than that for an uncoated glass tube abraded under the same conditions.

In some embodiments, after the coated glass container 100 is abraded by an identical glass container with a 30 N normal force, the coefficient of friction of the abraded area of the coated glass container 100 does not increase by more than about 20% following another abrasion by an identical glass container with a 30 N normal force at the same spot, or does not increase at all. In other embodiments, after the coated glass container 100 is abraded by an identical glass container with a 30 N normal force, the coefficient of friction of the abraded area of the coated glass container 100 does not increase by more than about 15% or even 10% following another abrasion by an identical glass container with a 30 N normal force at the same spot, or does not increase at all. However, it is not necessary that all embodiments of the coated glass container 100 display such properties.

The transparency and color of the coated container may be assessed by measuring the light transmission of the container within a range of wavelengths between 400-700 nm using a spectrophotometer. The measurements are performed such that a light beam is directed normal to the container wall such that the beam passes through the coating twice, first when entering the container and then when exiting it. In some embodiments, the light transmission through the coated glass container may be greater than or equal to about 55% of a light transmission through an uncoated glass container (passing through two walls of the container) for wavelengths from about 400 nm to about 700 nm. As described herein, a light transmission can be measured before a thermal treatment or after a thermal treatment, such as the heat treatments described herein. For example, for each wavelength of from about 400 nm to about 700 nm, the light transmission may be greater than or equal to about 55% of a light transmission through an uncoated glass container. In other embodiments, the light transmission through the coated glass container is greater than or equal to about 55%, about 60%, about 65%, about 70%, about 75%, about 80%, or even about 90% of a light transmission through an uncoated glass container for wavelengths from about 400 nm to about 700 nm.

As described herein, a light transmission can be measured before an environmental treatment, such as a thermal treatment described herein, or after an environmental treatment. For example, following a heat treatment of about 250° C., about 260° C., about 270° C., about 280° C., about 290° C., about 300° C., about 310° C., about 320° C., about 330° C., about 340° C., about 350° C., about 360° C., about 370° C., about 380° C., about 390° C., or about 400° C., for a period of time of 30 minutes, or after exposure to lyophilization conditions, or after exposure to autoclave conditions, the light transmission through the coated glass container is greater than or equal to about 55%, about 60%, about 65%, about 70%, about 75%, about 80%, or even about 90% of a light transmission through an uncoated glass container for wavelengths from about 400 nm to about 700 nm.

The yellowing caused by exposure to heat treatments can be measured by x and y coordinates according to the CEI 1931 color space, such as shown in FIG. 13, discussed with the Examples provided herein. Change in x and y coordinates following depyrogenation conditions may evidence yellowing of the coated glass article.

In some embodiments, the coated glass container 100 may be perceived as colorless and transparent to the naked human eye when viewed at any angle. In some other embodiments, the coating 120 may have a perceptible tint, such as when the coating 120 comprises a polymer which is colored.

In some embodiments, the coated glass container 100 may have a coating 120 that is capable of receiving an adhesive label. That is, the coated glass container 100 may receive an adhesive label on the coated surface such that the adhesive label is securely attached. However, the ability of attachment of an adhesive label is not a requirement for all embodiments of the coated glass containers 100 described herein.

EXAMPLES

The various embodiments of glass containers with coatings will be further clarified by the following examples. The examples are illustrative in nature, and should not be understood to limit the subject matter of the present disclosure. In the examples, all reported CoF data is the average CoF, not the maximum CoF as is discussed herein.

Example 1

Cyanate ester monomers were compared to assess their solubility in various commonly used commercial solvents. The monomers selected were Bisphenol A Cyanate Ester (DCBA), C,C'-[(dimethylsilylene)de-4,1-phenylene] ester (Si-DCBA), and C,C'-((2,2,2-trifluoro-1-(trifluoromethyl) ethylidene)di-4,1-phenylene) ester (F-DCBA). The solvents selected were ethanol, methanol, acetone, butanone (also known as methyl ethyl ketone (MEK)), methylene chloride ($CH_2Cl_2$), propylene glycol methyl ether acetate (PGMEA), and acetonitrile. Sample solutions were prepared by dissolving 50 mg of cyanate ester monomer powders in 10 mL of solvent. Sample solutions of each monomer in each solvent were prepared. The sample solutions were observed to determine the amount of time elapsed prior to the monomer becoming completely dissolved, that is, the amount of time elapsed prior to the sample solutions becoming completely transparent. The monomers of sample solutions in which more than 30 minutes elapsed prior to complete transparency were deemed incapable of completely dissolving. The results are reported in Table 1 below.

TABLE 1

| | Ethanol | Methanol | $CH_2Cl_2$ | PGMEA | Acetone | MEK | Acetonitrile |
|---|---|---|---|---|---|---|---|
| DCBA | >30 min. | >30 min. | ~10 min. | ~5 min. | ~30 sec. | ~30 sec. | <10 sec. |
| F-DCBA | <10 sec. | <10 sec. | <10 sec. | <10 sec. | <10 sec. | <10 sec. | <10 sec. |
| Si-DCBA | >30 min. | >30 min. | >30 min. | >30 min. | >30 min. | >30 min. | >30 min. |

As shown in Table 1, DCBA was able to completely dissolve in $CH_2Cl_2$, PGMEA, acetone, MEK, and acetonitrile within several seconds to several minutes but failed to completely dissolve in ethanol or methanol. F-DCBA exhibited superior solubility and was able to completely dissolve in all solvents within seconds. Si-DCBA exhibited the poorest solubility and was unable to completely dissolve in any of the solvents. Si-DCBA exhibited particularly low transparency in the ethanol and methanol solutions.

Example 2

Two sets of coated glass wafers were tested for transmission percentage in order to assess the transparency of various cyanate ester coatings in the UV-Visible light range. The first set (glasses 1-5) were 1 mm thick and the second set (glasses 6-10) were 2 mm thick. Glasses 1 and 7 were tested for transmission percentage in an uncoated condition.

Figure 4:
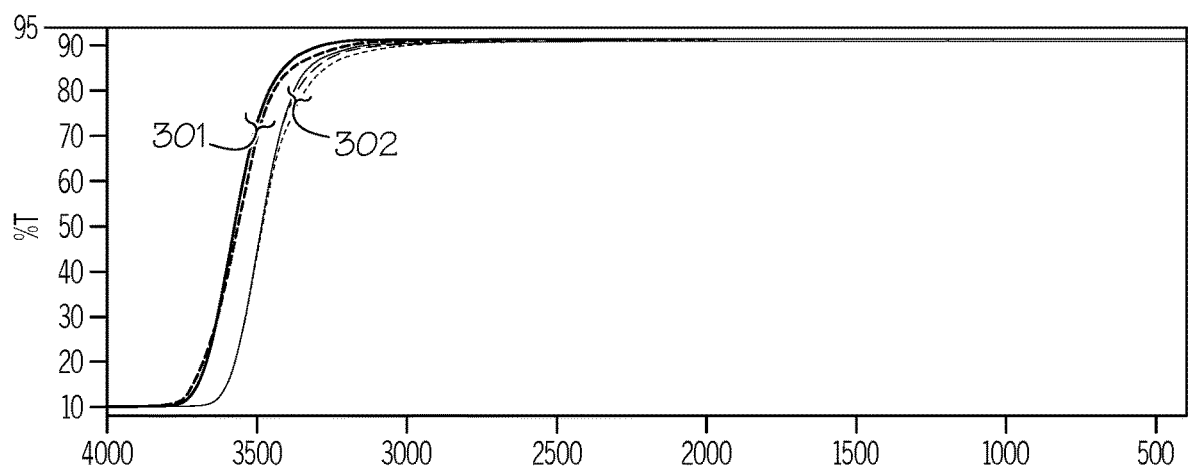
FIG. 4 plots the transmission percentage data for the samples of Example 2 against the light wavelength, according to one or more embodiments shown and described herein.

Glass 2 was tested for transmission percentage after being spin-coated in an F-DCBA prepolymer coating. Glasses 3-6 were tested for transmission percentage after being spin-coated in 30 mg/mL, 20 mg/mL, 10 mg/mL, and 5 mg/mL F-DCBA monomer coatings respectively. Glass 8 was tested for transmission percentage after being spin-coated in a DCBA prepolymer coating. Glasses 9-10 were tested for transmission percentage after being spin-coated in 30 mg/mL and 20 mg/mL DCBA monomer coatings respectively. The results are graphically depicted in FIG. 4 and reported in Table 2 below. In FIG. 4, line 301 represents the data for glasses 1-5 and line 302 represents the data for glasses 6-10.

TABLE 2

| No. | Coating | Glass Thickness | Transmission % |
|---|---|---|---|
| Glass 1 | Uncoated | 1 mm | 92.08 |
| Glass 2 | F-DCBA Prepolymer Solution | 1 mm | 91.77 |
| Glass 3 | 30 mg/mL F-DCBA Monomer Solution | 1 mm | 92.06 |
| Glass 4 | 20 mg/mL F-DCBA Monomer Solution | 1 mm | 92.06 |
| Glass 5 | 10 mg/mL F-DCBA Monomer Solution | 1 mm | 91.88 |
| Glass 6 | 5 mg/mL F-DCBA Monomer Solution | 1 mm | 92.06 |
| Glass 7 | Uncoated | 2 mm | 91.88 |
| Glass 8 | DCBA Prepolymer Solution | 2 mm | 91.77 |
| Glass 9 | 30 mg/mL DCBA Monomer Solution | 2 mm | 91.41 |
| Glass 10 | 20 mg/mL DCBA Monomer Solution | 2 mm | 92.00 |

As shown in Table 2, the thickness of the glass wafer, the cyanate ester, the coating solution concentration, and whether the coating solution had been refluxed to form a prepolymer solution had little influence on the final optical properties of the glass. The transmission percentage decrease when comparing an uncoated glass wafer to a coated glass wafer was never greater than 0.5%. Moreover, referring to FIG. 4, nearly any difference between the transmission percentage of the two sets of coated vials is located entirely within the UV range (10-400 nm). That is, any influence these properties had on the transmission percentage would not be detectable by visual inspection.

Example 3

Pharmaceutical packaging vials were dip-coated in an F-DCBA monomer coating, and the coating was subsequently cured (Initial Curing). After curing, the coated vials were tested for CoF by the testing procedures as is described herein. The coated vials were then subjected to further heat treatments for 30 minutes at 260° C. (Second Heat Treatment) and tested again for CoF. Finally, the coated vials were subjected to yet another heat treatment for 16 hours at 335° C. (Final Heat Treatment) and tested for CoF. The results are reported in Table 3 below.

TABLE 3

| Force (N) | Position | Avg. CoF |
|---|---|---|
| 5 | After Initial Curing | 0.100 |
| 5 | After Second Heat Treatment | 0.431 |
| 5 | After Final Heat Treatment | 0.923 |
| 30 | After Initial Curing | 0.128 |
| 30 | After Second Heat Treatment | 0.406 |
| 30 | After Final Heat Treatment | 0.762 |

As shown in Table 3, the coated vials have excellent CoF values after the initial curing process. However, after heat treatments the CoF values increase significantly. This increase in CoF values may be due to a lack of complete curing by the coating, indicating that a temperature greater than 200° C. may be necessary for complete crosslinking and good thermal resistance. Further, this increase in CoF values may be due to the decomposition of F-DCBA caused by side reactions during the coating and curing processes. Compared to DCBA, F-DCBA is less stable due to the highly active cyanate ester moiety, leading to side reactions with both Lewis acids and bases such as water and undried solvents. However, CoF after second heat treatment remained lower than that of bare glass.

Example 4

F-DCBA monomer coatings were tested for contact angle in order to characterize the wettability of liquid on the coating surface. Glass wafers measuring 50 mm×50 mm×1.1 mm were spin-coated in an F-DCBA monomer coating. After spin-coating, the F-DCBA monomer was cured for 1 hour at 180° C. and an additional 1 hour at 200° C. After curing, the coated glass wafers were subjected to heating for 16 hours at 335° C. The contact angle was measured by measuring the contact angle between a 2.0 µL water droplet and the cyanate ester coated surface. The contact angle was measured once after curing and at various stages of the thermal resistance test, for a total of six measurements. The results are reported in Table 4 below.

TABLE 4

| Measurement Time | Contact Angle |
|---|---|
| After Curing | 80.1 |
| After 1 h at 335° C. | 79.5 |
| After 2 h at 335° C. | 75.2 |
| After 4 h at 335° C. | 72.0 |
| After 8 h at 335° C. | 70.0 |
| After 16 h at 335° C. | 61.5 |

As shown in Table 4, the contact angle decreased gradually with the extension of heating time. This may indicate the gradual decomposition of the F-DCBA coating during thermal resistance testing. It is believed that this decrease in contact angle is due to the wettability of the coating surface approaching that of bare glass due to a reduction in coating thickness. Based on the results of Table 4, the contact angle measured after 4 hours at 335° C. was chosen as the critical heating time for judging the thermal resistance property of cyanate ester coatings. At that point, the change in contact angle becomes obvious when compared to the initial state.

Example 5

DCBA monomer coatings were tested for contact angle and CoF in a similar manner as Example 4. Glass wafers measuring 50 mm×50 mm×1.1 mm were spin-coated in DCBA monomer in an MEK. After spin-coating, the DCBA monomer was cured for 1 hour at 180° C. and an additional 1 hour at 200° C. Following curing, the coated vials were subjected to heating for 8 hours at 335° C. Contact angle was measured after curing and at various stages of the thermal resistance testing. The results are reported in Table 5 below.

TABLE 5

| Measurement Time | Contact Angle |
|---|---|
| After Curing | 101.9 |
| After 1 h at 335° C. | 102.4 |
| After 2 h at 335° C. | 98.7 |
| After 4 h at 335° C. | 88.5 |
| After 8 h at 335° C. | 72.9 |
| After 16 h at 335° C. | 46.9 |

As shown in Table 5, the DCBA coatings are more hydrophobic than the F-DCBA coatings of Example 4. While fluorinated compounds, such as F-DCBA, should have greater hydrophobicity and lubrication, the results show that DCBA coatings may have a contact angle as high as 102.4 compared to the highest measured F-DCBA coating contact angle of 80.1 in Example 4. Further, even after thermal resistance testing for 4 hours, the DCBA coatings had a superior contact angle than the initial contact angle of the F-DCBA coating reported in Table 4. This may be due to the instability of F-DCBA during the curing process, indicating that the F-DCBA coatings may tend to decompose more rapidly than the relatively stable DCBA coatings.

Example 6

Two batches of pharmaceutical packaging vials were dip coated in DCBA monomer in an MEK solvent. The first batch (DCBA-1) was cured for 1 hour at 180° C. and an additional 1 hour at 200° C. The second batch (DCBA-4) was cured for 1 hour at 180° C. and an additional for 4 hours at 200° C. After curing, the coated vials were tested for CoF by the testing procedures as is described herein. The coated vials were then subjected to further heat treatments for 35 minutes at 320° C. and tested again for CoF. Finally, the coated vials were subjected to yet another heat treatment for 9 hours at 335° C. and tested for CoF. The results are reported in Table 6 below.

TABLE 6

| Batch | Force | Position | Avg. CoF |
|---|---|---|---|
| DCBA-1 | 5 | After Initial Curing | 0.276 |
| DCBA-1 | 5 | After Second Heat Treatment | 0.244 |
| DCBA-1 | 5 | After Final Heat Treatment | 0.522 |
| DCBA-1 | 30 | After Initial Curing | 0.263 |
| DCBA-1 | 30 | After Second Heat Treatment | 0.235 |
| DCBA-1 | 30 | After Final Heat Treatment | 0.610 |
| DCBA-4 | 5 | After Initial Curing | 0.355 |
| DCBA-4 | 5 | After Second Heat Treatment | 0.330 |
| DCBA-4 | 5 | After Final Heat Treatment | — |
| DCBA-4 | 30 | After Initial Curing | 0.295 |
| DCBA-4 | 30 | After Second Heat Treatment | 0.269 |
| DCBA-4 | 30 | After Final Heat Treatment | — |

As shown in Table 6, the CoF of DCBA-1 decreased slightly after the second heat treatment, but increased significantly after the extended final heat treatment. The CoF of DCBA-4, like DCBA-1, decreased slightly after the second heat treatment, but the CoF values were higher than that of DCBA-1 both after the initial curing and after heating. Based on these results, an extended curing time may have little impact on the CoF or thermal resistance of the DCBA coating.

Example 7

The thicknesses of DCBA coatings applied by spin-coating were observed by scanning electron microscopy (SEM). Glass wafers measuring 50 mm×50 mm×1.1 mm were spin-coated in a 20 mg/mL DCBA monomer coating and a 30 mg/mL prepolymer coating. After spin-coating the DCBA coatings were cured for 1 hour at 180° C. and an additional 1 hour at 200° C. The thicknesses of the cured coatings were then measured with the use of SEM. The average coating thickness of the DCBA monomer coating was 37.7 nm. The prepolymer coating was more concentrated and viscous with an average coating thickness of 221 nm. Further, a small gap was observed between the prepolymer coating and the glass surface. This may indicate that the adhesion of the coating may be affected by residual solvent during the curing process.

Example 8

The thicknesses of F-DCBA coatings applied by spin-coating were observed by SEM. Glass wafers measuring 50 mm×50 mm×1.1 mm were spin-coated in a 20 mg/mL F-DCBA monomer coating, a 30 mg/mL F-DCBA monomer coating, and a 20 mg/mL F-DCBA prepolymer coating. After spin-coating the F-DCBA coatings were cured for 1 hour at 180° C. and an additional 1 hour at 200° C. The thicknesses of the cured coatings were then measured with the use of SEM. The average coating thickness of the 20 mg/mL F-DCBA monomer coating was 58.2 nm. The average coating thickness of the 30 mg/mL F-DCBA monomer coating was 158 nm. The prepolymer coating was again more concentrated and viscous with an average coating thickness of 480 nm. Further, it was observed that not only did coating thickness increase as the concentration of the coating increased, but variation in thickness across the surface of the glass also increased.

It should now be understood that the glass containers with low-frictive coatings described herein exhibit improved resistance to mechanical damage as a result of the application of the low frictive coating and, as such, the glass containers have enhanced mechanical durability. This property makes the glass containers well suited for use in various applications including, without limitation, pharmaceutical packaging materials.

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

What is claimed is:

1. A pharmaceutical package comprising:
   a glass container comprising a first surface and a second surface opposite the first surface, wherein the first surface is an outer surface of the glass container; and
   a coating positioned over at least a portion of the first surface of the glass container, the coating comprising at least 99.9 wt. % polycyanurate.

2. The pharmaceutical package of claim 1, wherein the polycyanurate comprises monomeric units formed from one or more bisphenol cyanate esters.

3. The pharmaceutical package of claim 2, wherein the one or more bisphenol cyanate esters are chosen from bisphenol A cyanate ester, bisphenol E cyanate ester, C,C'-((2,2,2-trifluoro-1-(trifluoromethyl)ethylidene)di-4,1-phenylene) ester, tetramethylbisphenol F cyanate ester, and bisphenol M cyanate ester.

4. The pharmaceutical package of claim 1, wherein the coating has a thickness of 100 nm or less.

5. The pharmaceutical package of claim 1, wherein the coating is in direct contact with at least a portion of the first surface of the glass container.

6. The pharmaceutical package of claim 1, wherein the portion of the first surface of the glass container with the coating has a coefficient of friction of less than or equal to about 0.7, wherein the coefficient of friction is a maximum coefficient of friction measured relative to a second pharmaceutical package in a vial-on-vial testing jig under a normal load of 30 N, the second pharmaceutical package formed from the same glass composition and comprising the same coating and subjected to the same environmental conditions prior to measurement as the pharmaceutical package.

7. The pharmaceutical package of claim 6, wherein the portion of the first surface of the glass container with the coating retains the coefficient of friction of less than or equal to about 0.7 following a heat treatment at a temperature of at least about 250° C. for 30 minutes.

8. The pharmaceutical package of claim 1, wherein a light transmission through the pharmaceutical package is greater than or equal to about 55% of a light transmission through an uncoated pharmaceutical package for each wavelength from about 400 nm to about 700 nm.

9. The pharmaceutical package of claim 8, wherein the pharmaceutical package retains the light transmission through the pharmaceutical package of greater than or equal to about 55% of the light transmission through the uncoated pharmaceutical package for each wavelength from about 400 nm to about 700 nm following a heat treatment at a temperature of at least about 250° C. for 30 minutes.

10. The pharmaceutical package of claim 1, wherein the coating consists of polycyanurate.

11. A pharmaceutical package comprising:
a glass container comprising a first surface and a second surface opposite the first surface, wherein the first surface is an outer surface of the glass container; and
a coating positioned over at least a portion of the first surface of the glass container, the coating comprising polycyanurate; and
wherein the coating has a thickness of 100 nm or less; and
wherein the portion of the first surface of the glass container with the coating has a coefficient of friction of less than or equal to about 0.7, wherein the coefficient of friction is a maximum coefficient of friction measured relative to a second pharmaceutical package in a vial-on-vial testing jig under a normal load of 30 N, the second pharmaceutical package formed from the same glass composition and comprising the same coating and subjected to the same environmental conditions prior to measurement as the pharmaceutical package.

* * * * *